(12) United States Patent
Chmiel et al.

(10) Patent No.: US 11,435,901 B1
(45) Date of Patent: *Sep. 6, 2022

(54) BACKUP SERVICES FOR DISTRIBUTED FILE SYSTEMS IN CLOUD COMPUTING ENVIRONMENTS

(71) Applicant: Qumulo, Inc., Seattle, WA (US)

(72) Inventors: Michael Anthony Chmiel, Seattle, WA (US); Duncan Robert Fairbanks, Seattle, WA (US); Stephen Craig Fleischman, Seattle, WA (US); Nicholas Graeme Williams, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,167

(22) Filed: Sep. 24, 2021

Related U.S. Application Data

(63) Continuation of application No. 17/203,371, filed on Mar. 16, 2021, now Pat. No. 11,132,126.

(51) Int. Cl.
*G06F 12/00* (2006.01)
*G06F 3/06* (2006.01)
(Continued)

(52) U.S. Cl.
CPC ............ *G06F 3/0604* (2013.01); *G06F 3/065* (2013.01); *G06F 3/067* (2013.01); *G06F 3/0614* (2013.01);
(Continued)

(58) Field of Classification Search
CPC .... G06F 3/0604; G06F 16/113; G06F 16/128; G06F 3/0614; G06F 3/067; G06F 3/0683;
(Continued)

(56) References Cited

U.S. PATENT DOCUMENTS 5,165,031 A    11/1992 Pruul et al.
5,283,875 A    2/1994 Gibson et al.
(Continued)

FOREIGN PATENT DOCUMENTS

EP    1217551 A2    6/2002
EP    1498829 A1    1/2005
(Continued)

OTHER PUBLICATIONS

Office Communication for U.S. Appl. No. 16/226,587 dated Aug. 5, 2019, pp. 1-46.
(Continued)

*Primary Examiner* — John A Lane
(74) *Attorney, Agent, or Firm* — John W. Branch; Branch Partners PLLC

(57) ABSTRACT

Embodiments are directed to managing data in a file system that includes storage nodes and storage volumes in a cloud computing environment (CCE). A backup job may be executed to perform further actions, including: providing a backup identifier that is associated with the backup job; determining the storage nodes based on the file system and the CCE; disabling the file system by disabling the storage nodes, wherein each disabled storage node is associated with a shutdown timestamp; determining storage volumes associated with each disabled storage node; and generating storage images that archive a copy of information from the storage volumes; associating the storage images with the backup identifier; confirming that the file system is consistent based on an absence of file system activity occurring subsequent to each shutdown timestamp; and enabling the file system by enabling the storage nodes.

20 Claims, 13 Drawing Sheets

(51) Int. Cl.
*G06F 16/11* (2019.01)
*G06F 11/14* (2006.01)

(52) U.S. Cl.
CPC ........ *G06F 3/0683* (2013.01); *G06F 11/1446* (2013.01); *G06F 11/1448* (2013.01); *G06F 11/1466* (2013.01); *G06F 16/113* (2019.01); *G06F 16/128* (2019.01)

(58) Field of Classification Search
CPC .............. G06F 11/1446; G06F 11/1448; G06F 11/1466
See application file for complete search history.

(56) References Cited

U.S. PATENT DOCUMENTS

| | | |
|---|---|---|
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 * | 1/2007 | Yagawa ............... G06F 11/2069 711/165 |
| 7,213,040 B1 | 5/2007 | Stokes et al. |
| 7,330,948 B2 * | 2/2008 | Deguchi ............. G06F 11/2069 711/162 |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 * | 10/2016 | Natanzon ................ G06F 3/067 |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 11,157,458 B1 | 10/2021 | Carter et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 * | 5/2004 | Lin ...................... G06F 16/1727 711/162 |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |

(56) References Cited

U.S. PATENT DOCUMENTS

| | | |
|---|---|---|
| 2007/0100855 A1 | 5/2007 | T. Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1* | 7/2008 | Torii .................. G06F 16/1827 |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1* | 7/2012 | Prahlad ............... G06F 11/1448 711/162 |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim |
| 2014/0059158 A1 | 2/2014 | Chen et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1* | 7/2015 | Eslami Sarab ..... G06F 11/1435 707/649 |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0110105 A1 | 4/2016 | Karamcheti et al. |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1* | 1/2017 | Bhagi ................. G06F 11/1448 |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1* | 4/2017 | Beck ...................... G06F 3/067 |
| 2017/0123883 A1 | 5/2017 | Hall |
| 2017/0123935 A1* | 5/2017 | Pandit ................ G06F 11/1451 |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1* | 10/2017 | Li ...................... G06F 16/24575 |
| 2017/0316321 A1 | 11/2017 | Whitney et al. |
| 2017/0336983 A1 | 11/2017 | Roh et al. |
| 2017/0344598 A1* | 11/2017 | Constantinescu ... G06F 16/1748 |
| 2017/0344905 A1* | 11/2017 | Hack ...................... G06N 20/00 |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1* | 3/2018 | Mitkar ................ G06F 11/1451 |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1* | 9/2018 | Blea ................... G06F 11/2064 |

(56) References Cited

U.S. PATENT DOCUMENTS

| | | |
|---|---|---|
| 2018/0288057 A1 | 10/2018 | Varadamma et al. |
| 2018/0314423 A1 | 11/2018 | Gong et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0286521 A1 | 9/2019 | Okpotse et al. |
| 2019/0286528 A1* | 9/2019 | Wu ............................ G06F 11/07 |
| 2019/0384640 A1 | 12/2019 | Swamy et al. |
| 2020/0004977 A1* | 1/2020 | Araujo ................ G06F 16/1734 |
| 2020/0026438 A1 | 1/2020 | Peleg et al. |
| 2020/0034077 A1* | 1/2020 | Haravu ................... G06F 3/067 |
| 2020/0142878 A1 | 5/2020 | Varadarajan et al. |
| 2020/0174692 A1 | 6/2020 | Dave et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0191650 A1 | 6/2021 | Vansteenkiste et al. |
| 2021/0240393 A1 | 8/2021 | Jo et al. |
| 2021/0240678 A1 | 8/2021 | Patel et al. |
| 2021/0311841 A1* | 10/2021 | McNutt ............... H04L 41/0886 |
| 2021/0374105 A1 | 12/2021 | Kodama et al. |
| 2022/0019361 A1 | 1/2022 | Kurata et al. |
| 2022/0091739 A1 | 3/2022 | Kumar et al. |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/228,716 dated Jun. 24, 2019, pp. 1-10.

Office Communication for U.S. Appl. No. 16/231,354 dated Jul. 10, 2019, pp. 1-8.

Office Communication for U.S. Appl. No. 16/262,756 dated Aug. 5, 2019, pp. 1-35.

Office Communication for U.S. Appl. No. 15/967,499 dated Jun. 27, 2018, pp. 1-16.

Office Communication for U.S. Appl. No. 16/226,587 dated Feb. 25, 2019, pp. 1-43.

Office Communication for U.S. Appl. No. 16/228,716 dated Feb. 28, 2019, pp. 1-15.

Office Communication for U.S. Appl. No. 16/231,354 dated Mar. 25, 2019, pp. 1-10.

Office Communication for U.S. Appl. No. 16/262,756 dated Apr. 2, 2019, pp. 1-29.

Office Communication for U.S. Appl. No. 16/262,790 dated Aug. 23, 2019, pp. 1-16.

Office Communication for U.S. Appl. No. 16/262,790 dated Apr. 18, 2019, pp. 1-14.

Office Communication for U.S. Appl. No. 16/262,756 dated Oct. 25, 2019, pp. 1-4.

Office Communication for U.S. Appl. No. 16/659,488 dated Dec. 30, 2019, pp. 1-6.

Office Communication for U.S. Appl. No. 14/595,598 dated Dec. 31, 2019, pp. 1-16.

Office Communication for U.S. Appl. No. 16/004,208 dated Aug. 27, 2018, pp. 1-11.

Office Communication for U.S. Appl. No. 16/234,395 dated Aug. 8, 2019, pp. 1-10.

Office Communication for U.S. Appl. No. 16/234,334 dated Apr. 5, 2019, pp. 1-15.

Office Communication for U.S. Appl. No. 16/234,395 dated Mar. 28, 2019, pp. 1-10.

Kappes, Giorgos et al., "Dike: Virtualization-aware Access Control for Multitenant Filesystems", Feb. 18, 2013, pp. 1-6.

Hitz, Dave et al., "Merging NT and UNIX filesystem Permissions", Proceedings of the 2nd USENIX Windows NT Symposium, Seattle, Washington, Aug. 3-4, 1998, pp. 1-10.

Office Communication for U.S. Appl. No. 16/234,334 dated Oct. 11, 2019, pp. 1-16.

Office Communication for U.S. Appl. No. 15/473,051 dated Jun. 30, 2017, pp. 1-23.

Extended European Search Report for European Patent Application No. 18155779.4 dated Apr. 17, 2018, pp. 1-15.

Office Communication for U.S. Appl. No. 16/004,182 dated Aug. 23, 2018, pp. 1-43.

Office Communication for U.S. Appl. No. 16/004,182 dated Mar. 5, 2019, pp. 1-46.

Office Communication for U.S. Appl. No. 16/004,182 dated Jul. 3, 2019, pp. 1-45.

Office Communication for U.S. Appl. No. 15/694,604 dated Jun. 3, 2019, pp. 1-8.

Office Communication for U.S. Appl. No. 16/004,182 dated May 22, 2019, pp. 1-4.

Office Communication for U.S. Appl. No. 14/595,043 dated May 4, 2017, pp. 1-30.

Office Communication for U.S. Appl. No. 14/595,043 dated Feb. 23, 2018, pp. 1-16.

Office Communication for U.S. Appl. No. 14/595,043 dated May 25, 2018, pp. 1-7.

Office Communication for U.S. Appl. No. 14/595,043 dated Oct. 5, 2018, pp. 1-17.

Office Communication for U.S. Appl. No. 14/595,043 dated Jun. 7, 2019, pp. 1-19.

Office Communication for U.S. Appl. No. 14/658,015 dated Aug. 27, 2019, pp. 1-17.

Office Communication for U.S. Appl. No. 14/658,015 dated Apr. 27, 2017, pp. 1-7.

Office Communication for U.S. Appl. No. 14/658,015 dated Jan. 4, 2018, pp. 1-28.

Office Communication for U.S. Appl. No. 14/658,015 dated Jul. 13, 2018, pp. 1-8.

Office Communication for U.S. Appl. No. 14/859,061 dated Sep. 22, 2017, pp. 1-16.

Office Communication for U.S. Appl. No. 15/831,236 dated Mar. 30, 2018, pp. 1-8.

Office Communication for U.S. Appl. No. 15/831,236 dated Aug. 15, 2018, pp. 1-14.

Office Communication for U.S. Appl. No. 14/859,114 dated Jul. 24, 2017, pp. 1-41.

Office Communication for U.S. Appl. No. 14/859,114 dated Feb. 21, 2018, pp. 1-25.

Office Communication for U.S. Appl. No. 14/859,114 dated May 11, 2018, pp. 1-5.

Office Communication for U.S. Appl. No. 14/859,114 dated Jun. 27, 2018, pp. 1-33.

Office Communication for U.S. Appl. No. 14/859,114 dated Nov. 19, 2018, pp. 1-35.

Office Communication for U.S. Appl. No. 14/859,114 dated Jan. 31, 2019, pp. 1-4.

Office Communication for U.S. Appl. No. 14/859,114 dated Mar. 7, 2019, pp. 1-32.

Office Communication for U.S. Appl. No. 14/859,114 dated Jun. 26, 2019, pp. 1-21.

Office Communication for U.S. Appl. No. 14/859,114 dated Sep. 13, 2019, pp. 1-6.

Office Communication for U.S. Appl. No. 14/859,114 dated Nov. 26, 2019, pp. 1-21.

Office Communication for U.S. Appl. No. 15/288,853 dated Sep. 19, 2018, pp. 1-13.

(56) References Cited

OTHER PUBLICATIONS

Chimera, Richard, "Value Bars: An information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25. 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 23, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_ science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-7.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.

(56) References Cited

OTHER PUBLICATIONS

Office Communication for U.S. Appl. No. 16/004,182 dated Nov. 30. 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 23, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 2021, pp. 1-4.
Office Communication for U.S. Appl. No. 16/004,182 dated Sep. 10, 2021, pp. 1-4.
Office Communication for U.S. Appl. No. 16/004,132 dated Sep. 29, 2021, pp. 1-11.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/062,500 dated Mar. 22, 2022, pp. 1-19.
Office Communication for U.S. Appl. No. 17/504,289 dated Mar. 28, 2022, pp. 1-9.
Office Communication for U.S. Appl. No. 17/588,120 dated Apr. 11, 2022, pp. 1-36.
Office Communication for U.S. Appl. No. 17/588,895 dated Apr. 27, 2022, pp. 1-6.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.

(56) References Cited

OTHER PUBLICATIONS

Office Communication for U.S. Appl. No. 17/491,017 dated May 12, 2022, pp. 1-50.

* cited by examiner

BACKUP SERVICES FOR DISTRIBUTED FILE SYSTEMS IN CLOUD COMPUTING ENVIRONMENTS

CROSS-REFERENCE TO RELATED APPLICATIONS

This Utility Patent Application is a Continuation of U.S. patent application Ser. No. 17/203,371 filed on Mar. 16, 2021, now U.S. Pat. No. 11,132,126 issued on Sep. 28, 2021, the benefit of the filing date of which is hereby claimed under 35 U.S.C. § 120 and the contents of which is further incorporated in entirety by reference.

TECHNICAL FIELD

The present invention relates generally to file systems, and more particularly, but not exclusively, to backup services for distributed file systems in cloud computing environments.

BACKGROUND

Modern computing often requires the collection, processing, or storage of very Large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may include many storage volumes that may be subject to failure. In some cases, file systems may be hosted or implemented in cloud computing environments. Conventionally, distributed file system may include various built-in tools for managing various file system data, such as, backups, replication, data archiving, versioning, and so on. Also, in some cases, cloud computing environments may also provide some services directed to managing data stored in cloud deployments. However, some cloud computing environment services may impact data consistency or data security features of distributed file systems. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
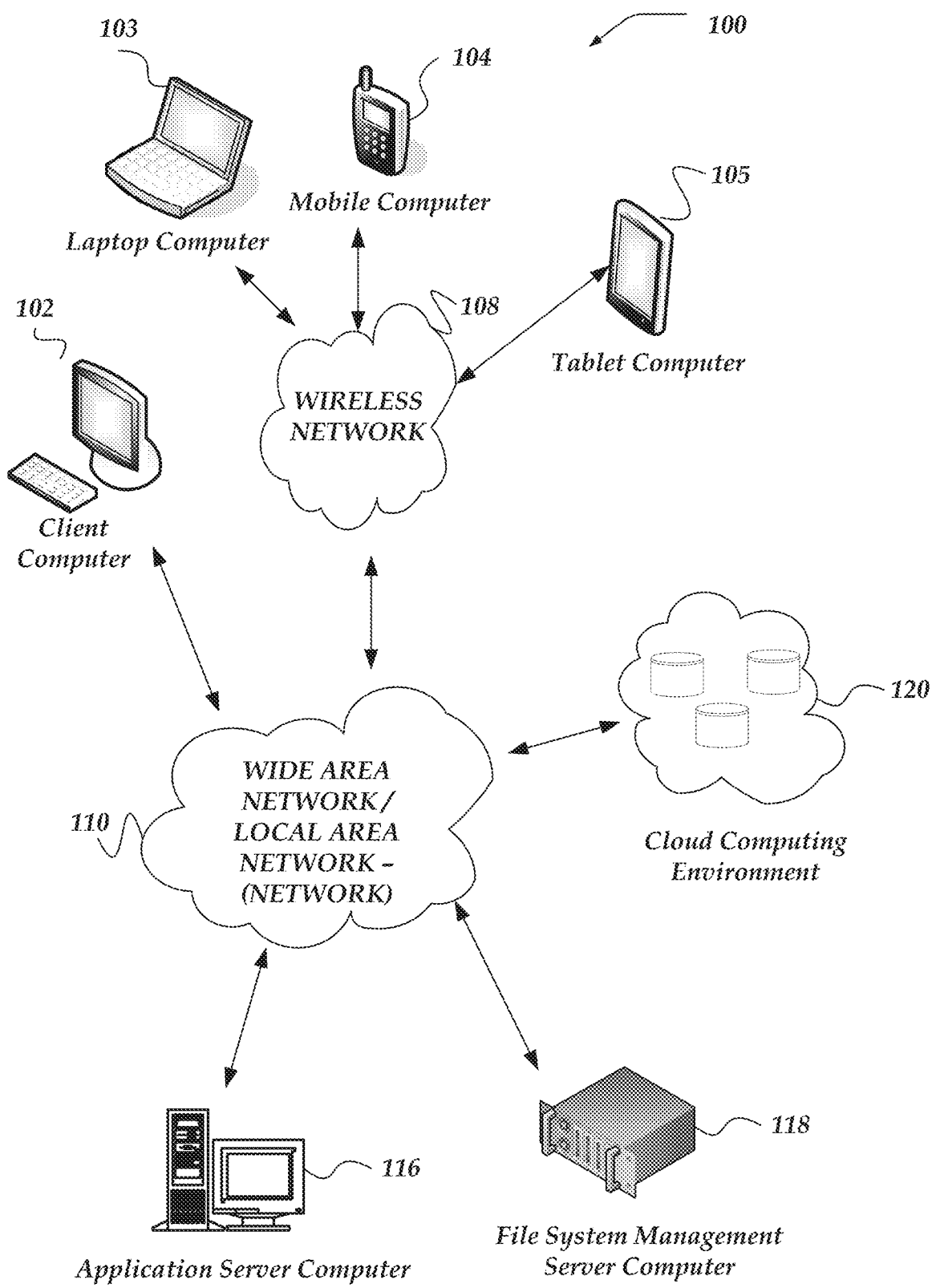
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object" refers to entities stored in a file system. These may include files, directories, or the like. In this document for brevity and clarity all objects stored in a file system may be referred to as file system objects.

As used herein the terms "file path," "file system path," or "hierarchical file system path," and so on refer to file system information that corresponds to the logical or physical locations of file system objects within file systems. File system clients may employ file system paths to refer to specific file system objects within a file system. For example, file paths may include fields or values that correspond to the hierarchy of directories in the file system that correspond to the location of the file system object. In some cases, the name or label of the file may be considered path of the file system path. Also, often file system paths may be human readable.

As used herein the terms "block," or "file system object block" refer to the file system data objects that comprise a file system object. For example, small sized file system objects, such as, directory objects or small files may be comprised of a single block. Whereas larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the terms "document object," or "document" refer to file system objects that may be considered a file. Accordingly, document objects may include one or more blocks that represent one combined file. The term document may be used to distinguish file system objects that are files from file system objects that may represent directories, folders, blocks, or the like. Documents have one or more content blocks that store the data comprising the document. Herein, documents may represent file that store any type of compressed or uncompressed data, such as, text, binary data, media (e.g., video files, music files, images, sound files, or the like), application documents (e.g., word processing files, databases, programs, libraries, or the like), structured documents, or the like. Herein documents may be considered to be stored in a file system rather than an object store. Documents may be considered to be associated file system paths or other file system meta-data that may be irrelevant or unavailable on object stores.

As used herein the term "storage volume" refers to virtualized data stores provided by cloud computing environments. Various attributes or features of storage volumes may vary depending on the cloud computing environment. However, in general, storage volumes may be considered to be logically similar to physical storage devices, such as, hard drives, solid state drives, network drives, or the like. Cloud computing environments provide APIs or other interfaces that enable programmatic provisioning of storage volumes. Also, among other things, cloud computing environment provide APIs or other interfaces that enable programmatic assignment/association of storage volumes with one or more virtualized network computers in the cloud computing environment.

As used herein the term "root volume" refers to a storage volume that includes files, programs, or the like, associated with administrative services of a storage node in a cloud computing environment. In some cases, root volumes may be storage volumes that store operating systems, kernel images, user access information, system libraries, log files, or the like, for a compute instance of a cloud computing environment. One of ordinary skill in the art may consider root volumes similar to Linux boot volumes/devices. Thus, storage nodes in cloud computing environments may be assumed to have one root volume.

As used herein the term "storage image" refers to a persistent backup of a storage volume. Cloud computing environments may provide APIs or other interfaces that enable programmatic generation of storage images from storage volumes. Similarly, cloud computing environments may provide APIs or other interfaces that enable storage volumes to be generated or restored from storage images.

As used herein the term "file system backup," "backup," refers to collection of storage images that each correspond to one or more storage volumes that comprise one or more portions of a distributed file system in a cloud computing environment. For example, if a distributed file system includes four storage volumes, a backup of the file system may include four storage images each corresponding to one of the four storage volumes.

As used herein the term "launch image" refers to data structures that cloud computing environments may employ to instantiate compute instances (e.g., virtualized network computers). Launch images may be considered to be templates that define various characteristics for storage nodes that may be instantiated in cloud computing environments. The format and fields of launch images may vary depending on cloud computing environments or cloud providers. However, they generally enable organizations to programmatically declare various features or attributes of compute instances that may be instantiated in cloud computing environments.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, the file system that includes a plurality of storage nodes and a plurality of storage volumes may be provided such that each storage node may be a compute instance provided by a cloud computing environment (CCE) and each storage volume may be a data store provided by the CCE.

In one or more of the various embodiments, a backup job may be executed to perform further actions, including: providing a backup identifier that is associated with the backup job; determining the plurality of storage nodes based on the file system and the CCE; disabling the file system by disabling the plurality of storage nodes such that each disabled storage node is associated with a shutdown timestamp; determining one or more storage volumes associated with each disabled storage node based on an association of each disabled storage node with the one or more storage volumes; and generating one or more storage images that archive a copy of information from the one or more storage volumes; associating the one or more storage images with the backup identifier; confirming that the file system is consistent based on an absence of file system activity occurring subsequent to each shutdown timestamp; and enabling the file system by enabling the plurality of storage nodes.

In one or more of the various embodiments, generating the one or more storage images may include: determining a root volume included with the one or more storage volumes such that the root volume is a storage volume that includes one or more of operating system programs, file system configuration information, or file system startup scripts; generating storage node metadata that includes information associated with the storage node that is associated with the root volume such that the storage node metadata includes one or more of storage volume information, network configuration, operating system version, or security information; and associating the storage node metadata with a storage image that corresponds to the root volume.

In one or more of the various embodiments, generating the one or more storage images may include: generating storage volume metadata that includes information associated with each storage volume such that the storage volume metadata includes one or more of storage slot information, storage volume type, volume size, block device name, shutdown timestamp, storage node identifier, or backup identifier; and associating the storage volume metadata for each storage volume with each storage image.

In one or more of the various embodiments, the backup identifier that corresponds to the backup job may be provided. In some embodiments, the plurality of storage images may be determined based on the backup identifier such that each determined storage image is associated with the backup identifier. In some embodiments, storage node metadata may be determined from each storage image that corresponds to a root volume. In some embodiments, one or more launch images may be generated based on the storage node metadata. And, in some embodiments, the one or more launch images may be employed to instantiate the plurality of storage nodes such that each instantiated storage node is associated with one or more storage volumes that are based on the plurality of storage images.

In one or more of the various embodiments, in response to a confirmation that the file system is consistent, a finalized tag may be associated with each storage image.

In one or more of the various embodiments, confirming that the file system is consistent may include: comparing each shutdown timestamp with an activity timestamp associated with a last occurrence of file system activity associated with each storage node; and in response to each shutdown timestamp being less than or equal to each activity timestamp associated with each storage node, confirming that the file system is consistent.

In one or more of the various embodiments, one or more network interfaces in the CCE may be determined based on one or more of one or more network addresses associated with the file system, or one or more other network identifiers associated with the file system such that the one or more determined network interface may be unassociated with another storage node in the CCE. In some embodiments, one or more new network interfaces may be generated based on an amount of the one or more determined network interfaces such that one or more network addresses for the one or more new network interfaces may be determined based on a root metadata associated with a root volume. And, in some embodiments, the one or more determined network interfaces and the one or more new network interfaces may be associated with one or more launch images that are employed to instantiate the plurality of storage nodes Illustrated Operating Environment FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, cloud computing environment 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, cloud computing environment 120, or other computers.

Client computers 102-105 may further be configured to include a client application that enables an end-user to log into an end-user account that may be managed by another computer, such as application server computer 116, file system management server computer 118, cloud computing environment 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, cloud computing environment 120, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, cloud computing environment 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

In some embodiments, cloud computing environment 120 may be one or more public or private cloud computing environments. In some embodiments, cloud computing environments may be provided by various vendors or developed internally or privately. Cloud computing environments typically provide virtualized network computers (e.g., compute instances), virtualized storage (e.g., storage volumes), virtualized network interfaces, or the like. Various cloud computing environments may be assumed to have one or more APIs or interfaces that enable users or services to provision resources, provision storage, configure networking, monitoring usage/status, or the like. One of ordinary skill in the art will be well acquainted with public or private cloud computing environments.

Also, one embodiment of file system management server computer 118 is described in more detail below in conjunction with FIG. 3. Although FIG. 1 illustrates file system management server computer 118, or the like, as a single computer, the innovations or embodiments described herein are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks, such as, cloud computing environment 120. Accordingly, these innovations and embodiments are not to be construed as being limited to a single environment, and other configurations, and other architectures are also envisaged.

Illustrative Client Computer

Figure 2:
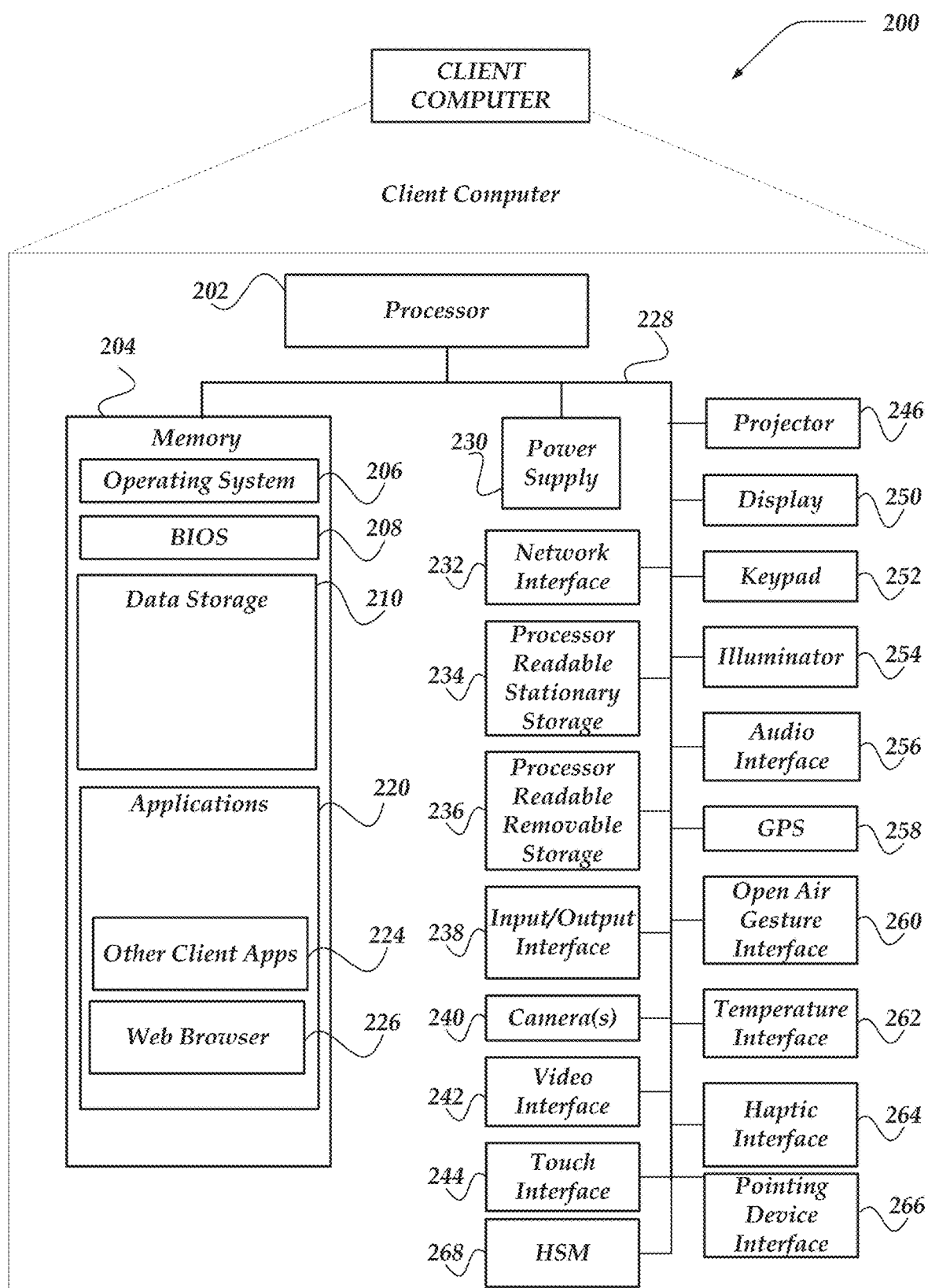
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Apple Corporation's iOS or macOS® operating systems. The operating system may include, or interface various runtime engines, including Java virtual machines, or the like, that may enable control of hardware components or operating system operations via application programs supported by the various runtime engines.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include other client applications 224, web browser 226, or the like. Client computers may be arranged to exchange communications one or more servers or one or more other client computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
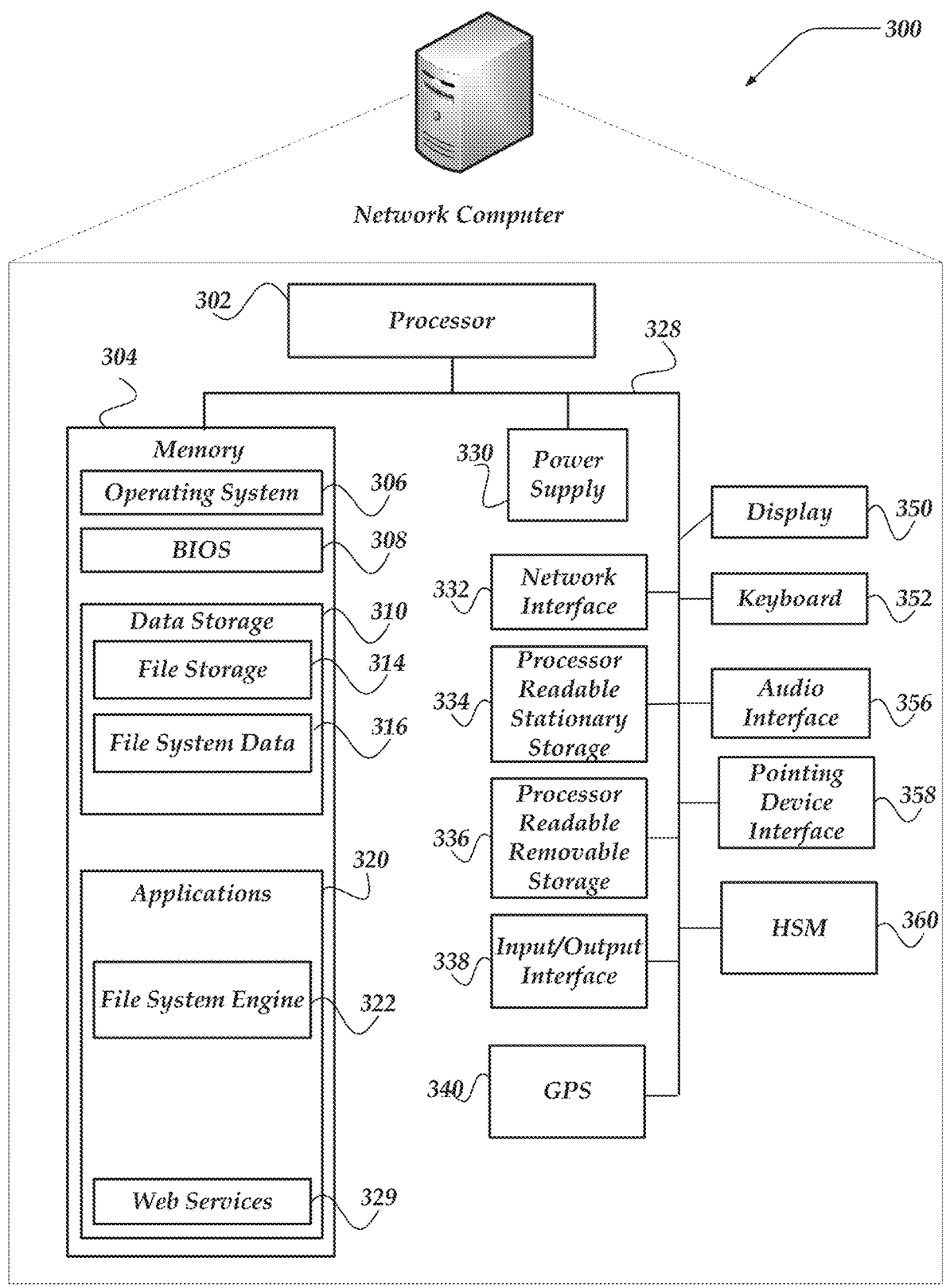
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1. Also, in some embodiments, network computer 300 may represent virtualized network computers in cloud computing environments, or the like.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
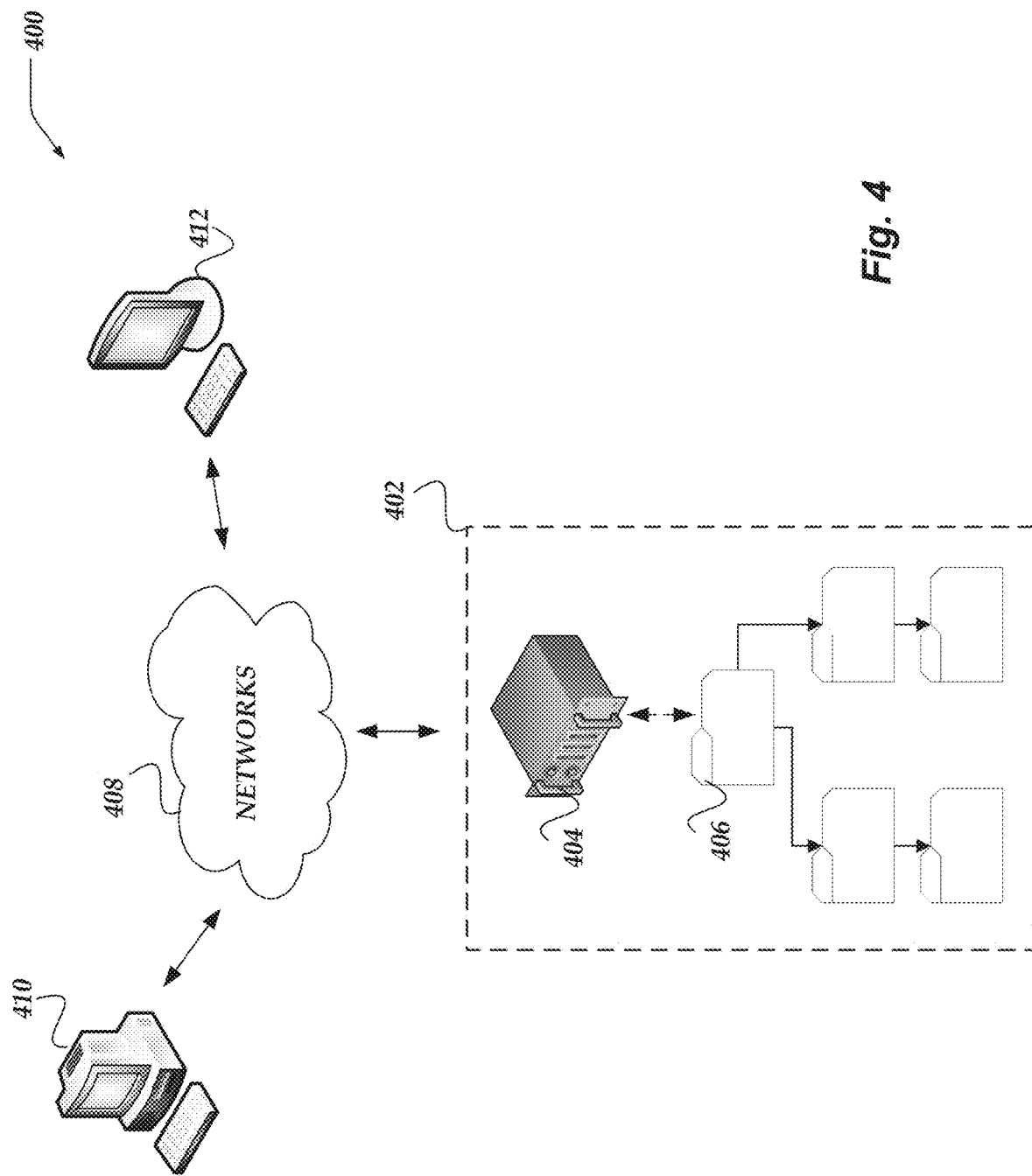
FIG. 4 illustrates a logical architecture of a system for backup services for distributed file systems in cloud computing environments in accordance with one or more of the various embodiments.

FIG. 4 illustrates a logical architecture of system 400 for backup services for distributed file systems in cloud computing environments in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system objects, documents, or the like) that may be stored in file system 402.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or the like, that may be stored in file system 402. In some embodiments, file system objects may include, files, documents, directories, folders, backups, snapshots, replication snapshots, replication information, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines or replication engines may be arranged to mimic the interface or behavior of one or more conventional file systems.

Also, while file system 402 is illustrated as using one file system management computer with one set of file system objects, these innovations are not so limited. Innovations herein contemplate file systems that include one or more file system management computers or one or more file system object data stores. In some embodiments, file system objects may be located remotely from one or more file system management computers. Also, a logical file system object store or file system may be spread across two or more cloud computing environments, storage clusters, or the like.

Figure 5:
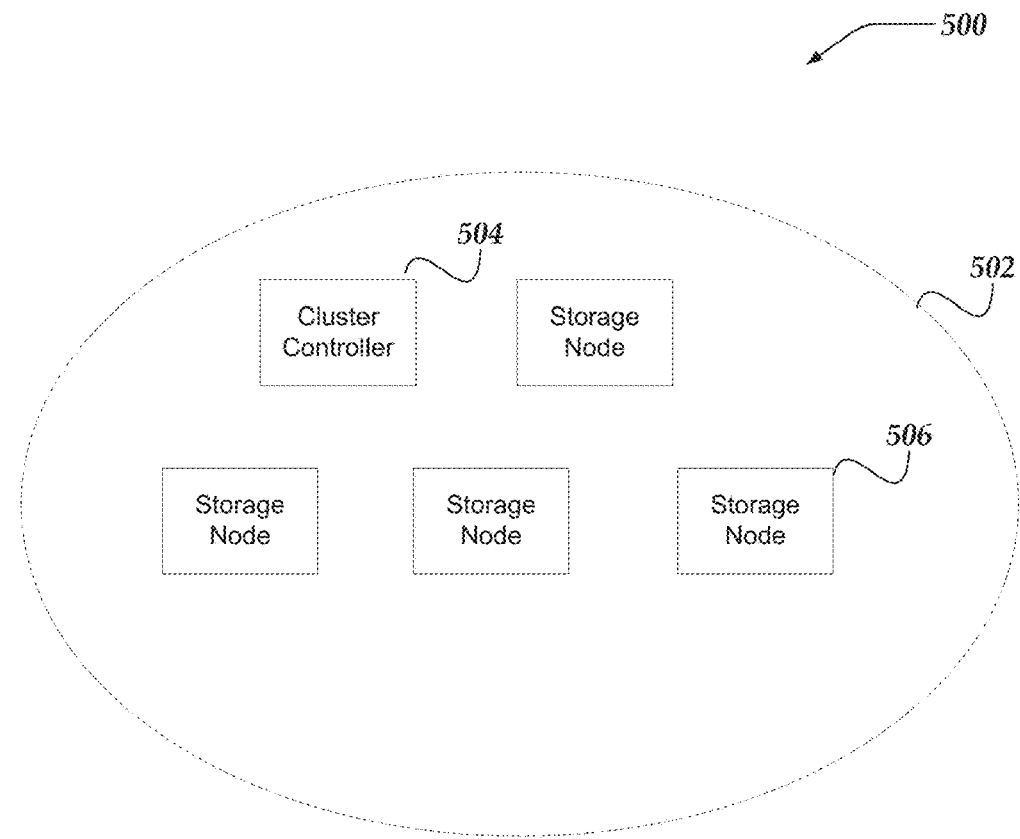
FIG. 5 illustrates a logical schematic of a cloud computing environment for backup services for distributed file systems in cloud computing environments in accordance with one or more of the various embodiments.

FIG. 5 illustrates a logical schematic of cloud computing environment 500 for backup services for distributed file systems in cloud computing environments in accordance with one or more of the various embodiments. As introduced above, file systems may be hosted or implemented in a cloud computing environment, such as, cloud computing environment 500.

In one or more of the various embodiments, cluster 502 may be virtualized file system cluster hosted in cloud computing environment 500. In this example, the boundary of cluster 502 is illustrated using a dashed line to represent the dynamic or elastic nature of a cloud-hosted file system cluster. Accordingly, in some embodiments, the innovations disclosed herein anticipate various conventional cloud computing features, such as, programmatically/dynamically provisioning components, such as, compute instances, storage volumes, or the like. Also, in some embodiments, innovations may rely on other programmatic/dynamic features often provided by cloud computing environments, such as, network configuration, grouping or association of various cloud environment components with other components, component/object tagging systems, component/object labeling, or the like.

However, in some embodiments, for some cloud environments, one or more features may be missing or distinct/different from what may be conventionally expected. Accordingly, in some embodiments, file system engines, or the like, may be arranged to include custom instructions or libraries, to provide one or more features that may be omitted from a given cloud computing environment. For example, in some embodiments, a cloud computing environment may omit a suitable tagging or labeling system. Thus, for this example, in some embodiments, file system engines may be arranged to provide or implement alternative systems such as a custom tagging system that associates key value pairs or other metadata with various components of the file system or cloud computing environment.

In one or more of the various embodiments, file systems host or implemented in cloud computing environments may be assumed to provide services similar as described above for FIG. 4. Thus, for brevity or clarity those descriptions are not repeated here.

In some embodiments, cluster 502 may include one or more cluster controllers, such as, cluster controller 504 and one or more storage nodes, such as, storage node 506, or the like. In one or more of the various embodiments, cluster controller 504 may be the same or similar as file system management computer 404, or the like. Also, in some embodiments, cluster controller 504 may be considered to be a cluster node that is designated (or elected) to provide some or all of the same services a file system management computer may provide.

In some embodiments, storage nodes, such as, storage node 506 may be considered to be cluster nodes that may be arranged to rely on or coordinate with cluster controllers, such as, cluster controller 504.

In one or more of the various embodiments, storage nodes may be associated with one or more storage volumes that may be provisioned from the cloud computing environment. In this example, the storage volumes are not shown but they may be considered to be logically associated with the storage nodes.

Note, in some embodiments, cluster controllers may be storage nodes that have been selected (or elected) to provide controller services. Thus, in some embodiments, cluster controller nodes may be associated with one or more storage volumes the same as storage nodes.

Figure 6:
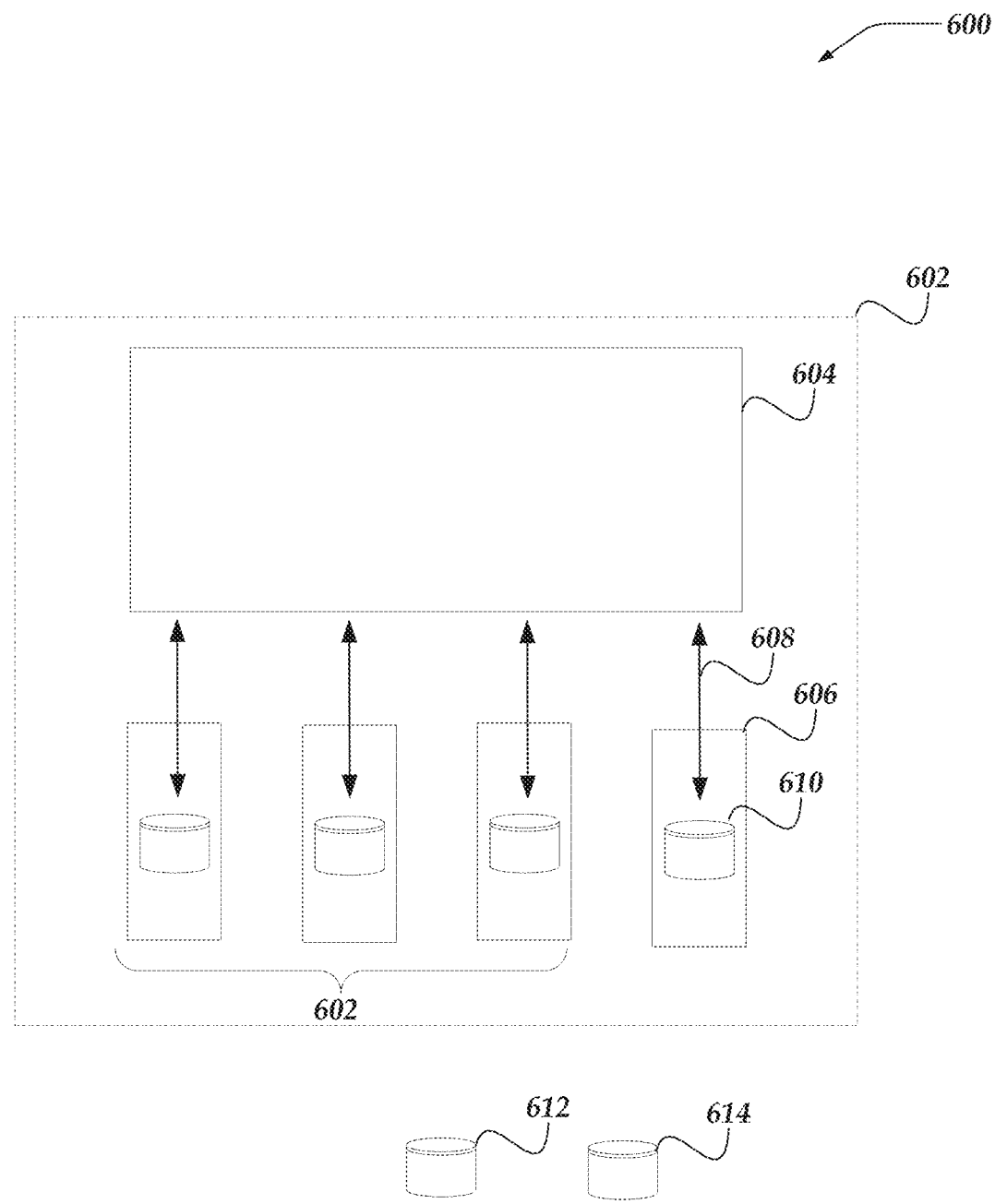
FIG. 6 illustrates a logical schematic of a cloud computing environment for backup services for distributed file systems in cloud computing environments in accordance with one or more of the various embodiments.

FIG. 6 illustrates a logical schematic of cloud computing environment 600 for backup services for distributed file systems in cloud computing environments in accordance with one or more of the various embodiments.

In one or more of the various embodiments, as described above, cloud computing environments may enable one or more compute instances that may be considered similar to storage nodes of a distributed file system.

In one or more of the various embodiments, nodes in cloud computing environments may be associated with one or more storage volumes similar or analogous to how storage volume devices may be physically coupled with physical storage nodes. However, rather than being physical storage devices (hard drives, solid state drives, or the like), storage volumes for cloud storage nodes may be virtualized storage volumes that may be communicatively coupled to compute instances in the cloud computing environment.

In one or more of the various embodiments, cloud computing environments may provide configuration tools, APIs, user interfaces, or the like, that enable users to configure or select storage volumes that may have different attributes (e.g., capacity, response time, I/O performance, encryption, or the like) based on the needs of an application of user. Accordingly, storage volumes may be logically associated with compute instances in cloud computing environment to provide private or logically local storage. Thus, in some embodiments, storage volumes that are associated with a compute instance may be considered virtual storage devices.

In one or more of the various embodiments, storage nodes, such as, storage node 602 may be comprised compute instance 604 and one or more storage slots, such as, storage slot 602 and storage slot 610. In some embodiments, each storage slot may represent a specified amount of data storage capabilities that correspond to the storage capacity a storage node may contribute to the file system.

In one or more of the various embodiments, storage nodes may be configured to have one or more storage slots each with known attributes. In some embodiments, storage slots may be considered analogous to physical storage device slots of a physical server. For example, a physical storage node may include one or more physical hard drives that each may be installed in a physical slot of the physical storage node. In cloud computing environments, in some embodiments, virtualized compute instances may be configured to have one or more storage slots that each represent or include an allocation of storage capacity in the cloud computing environment.

Accordingly, in some embodiments, file system operations may consider storage slots in cloud computing environments similar to physical storage slots. Thus, in some embodiments, conventional distributed file system operations, such as, erasure encoding, striping, recovery, replication, mirroring, or the like, that may leverage storage slots may be performed in cloud based distributed file systems similar as they may be in distributed file systems that are based on physical hardware.

In one or more of the various embodiments, virtualized storage slots, such as storage slots 602 and storage slot 606 may be associated with storage volumes, such as storage volume 610. In some embodiments, storage volumes may be storage capacity provided in cloud computing environments that may be analogous to storage devices. In some embodiments, various attributes of storage volumes may be defined, configured, or selected using one or more APIs, user interfaces, or the like, that may be provided by cloud providers that provide a given cloud computing environment. Accordingly, in some embodiments, file system engines, or the like, may be arranged to logically consider storage volumes similar to physical storage devices. For example, a physical storage node with four physical storage slots (each with one physical storage device) may be considered similarly to a virtualized storage node in a cloud computing environment that may be coupled with four virtualized storage slots that each associated with virtualized storage volume.

In one or more of the various embodiments, compute instances that may be coupled with storage volumes may be arranged exchange messages or data with its storage volumes via one or more data paths provided by the cloud computing environment. The particular underlying implementation of data paths may vary depending on the cloud provider, however they may be generally considered logical data busses that enable compute instance to interact with storage volumes similar to interactions with physical storage devices. In this example, data path 608 represent the one or more cloud computing environment features that enable compute instances to interact or access storage volumes in cloud computing environments.

In one or more of the various embodiments, cloud computing environments may enable the allocation or instantiation of storage volumes that may be unassociated with a particular compute instance. In some embodiments, this feature may enable storage volumes to be created in advance or otherwise reserved. Likewise, in some embodiments, cloud computing environments may enable storage volumes to be decoupled or disassociated from compute instances. In some cases, this may include discarding/reallocating unused storage volumes. Also, in some cases, decoupled storage volumes may be stored as part of an archival strategy, or the like. In this example, storage volume 612 and storage volume 614 represent allocated or instantiated storage volumes in a cloud computing environment that are not coupled with a compute instance. In terms of a distributed file system, uncoupled storage volumes may be considered unassociated with storage slots. Thus, in some embodiments, storage capacity that corresponds to uncoupled storage volumes may be unavailable to file systems.

Accordingly, in one or more of the various embodiments, associating a storage volume with a storage slot of a storage node in a file system cluster makes the storage capacity of the storage volume available to file system. Thus, in some embodiments, assigning a storage volume to a storage slot of storage node may be considered similar to installing a hardware storage device in a hardware server of a physical file system. For example, if the file system is arranged to automatically begin allocating data to newly installed hardware storage devices, similar actions may be performed if new storage volumes are assigned to storage slots. Note, the particular actions or behavior of file system engines, or the like, performed upon the discovery of new storage devices or new storage volumes may vary depending on the particular implementation of the file system, file system engines, or the like.

In some embodiments, in cloud computing environments various virtualized components, such as, compute instances, storage volumes, load balancers, firewalls, networks, or the like, may be dynamically provisioned or decommissioned enabling various advantageous features that cloud computing environments may be well known to provide.

Also, in one or more of the various embodiments, file system engines may be arranged to provide a user interface that enables users or services to validate or verify a file system on-demand. Accordingly, in some embodiments, file system engines may be arranged to enable users or services to trigger a validation/verification process to evaluate the current state of a file system.

In one or more of the various embodiments, file system engines may be arranged to provide a user interface that enables users or services to provide a query that includes one or more filters, or the like, that may be employed to generate one or more reports that list the storage images in the cloud computing environment that may be associated with a user, user account, backup identifier, file system, cluster name, or the like.

Similarly, in some embodiments, file system engines may be arranged to provide a user interface that enables authorized users to delete one or more storage images that may be determined via one or more queries to the cloud computing environment.

Figure 7:
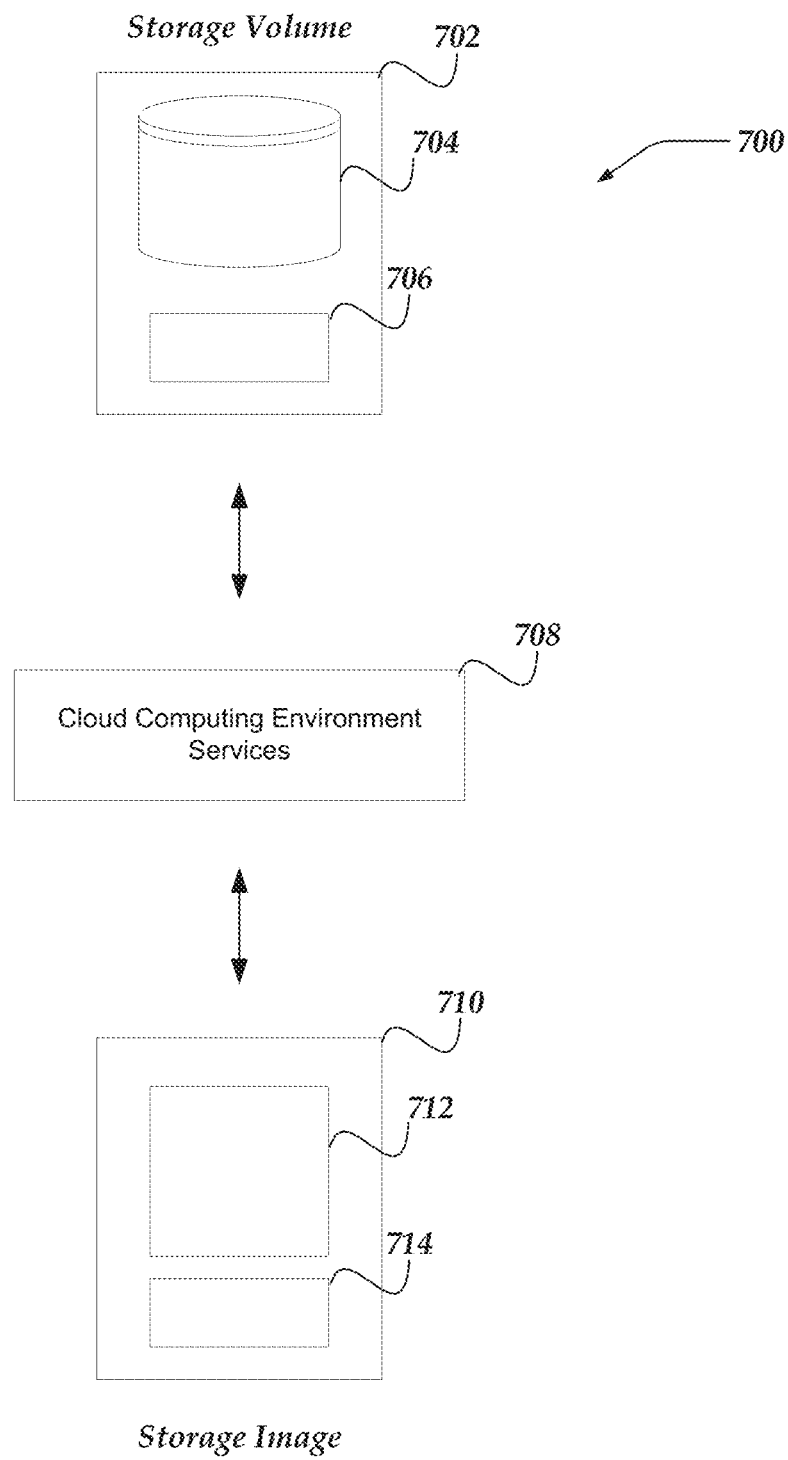
FIG. 7 illustrates a logical schematic of a system for backup services for distributed file systems in cloud computing environments in accordance with one or more of the various embodiments.

FIG. 7 illustrates a logical schematic of system 700 for backup services for distributed file systems in cloud computing environments in accordance with one or more of the various embodiments. Various cloud computing environments offered by cloud providers may have distinct or different underlying implementations of storage volumes. However, one of ordinary skill in the art will appreciate that they may be assumed to have facilities that enable various automatic/programmatic operations including, instantiation, provisioning, decommissioning, coupling with compute instances, decoupling from compute instances, or the like. Likewise, cloud computing environments may provide one or more different types of storage volumes with various performance/capacity features not unlike how different types or models of storage devices may have different features. Accordingly, in some embodiments, file system engines may be arranged to automatically provision storage volumes having capacity or features based on the requirements of a given file system. For example, in some embodiments, the configuration information associated with a file system may include parameters, rules, instructions, or the like, that may determine the attributes of storage volumes that may be associated with the storage slots of the storage nodes in the file system.

Also, in some embodiments, storage volumes may be associated with meta-data that file systems may employ to manage storage volumes in cloud computing environments. In some embodiments, cloud computing environments may provide features that enable meta-data to be associated with various cloud computing components, including storage volumes. For example, a cloud computing environment may include one or more APIs for associating key-value pairs with various cloud computing components.

Likewise, in some embodiments, cloud computing environments may enable various queries related to meta-data and the associated components. For example, for some embodiments, a cloud computing environment may enable queries that determine one or more components (e.g., storage volumes) that may be associated particular meta-data values.

Thus, if such built-in facilities may be available, file systems may be arranged to employ these facilities to associate meta-data with storage volumes, compute instances, or the like. However, in some embodiments, file systems may be arranged to provide custom meta-data databases if the necessary facilities are absent or otherwise inconvenient. For example, if the query facilities of a meta-data system of a cloud computing environment is inadequate, file systems may be arranged to employ custom meta-data management facilities.

In this example, storage volume 702 may be represented as including data storage 704 and meta-data 706. In some embodiments, data storage 704 may represent the storage space or capacity associated with a particular storage volume. And, in some embodiments, meta-data 706 may represent one or more meta-data entries associated with the particular storage volume.

Further, in some embodiments, cloud computing environments may provide facilities that enable storage images to be generated from storage volumes. Storage images may be considered point-in-time snapshots of data in a storage volume. Accordingly, in one or more of the various embodiments, cloud computing environments may include one or more services, such as, cloud computing environment services 708, or the like, that may programmatically be directed to generate storage images from storage volumes. In some embodiments, different cloud computing environments may support or provide different APIs or interfaces that may be employed to generate storage images from storage volumes. Thus, in some embodiments, while the particular API calls, parameters, or the like, may vary among cloud computing environments, one of ordinary skill in the art will appreciate that cloud computing environments may provide similar features that enable storage images to be generated from storage volumes.

Accordingly, in some embodiments, file system engines may be arranged to interact with different cloud computing environments by using different libraries, plug-ins, modules, or the like, that map one or more actions associated with backup services for distributed file systems in cloud computing environments to cloud computing environment specific (e.g., proprietary) operations. Thus, in some embodiments, file system engines may be arranged to employ rules, parameters, libraries, plug-ins, modules, or the like, provided via configuration information to account for implementation variations across one or more cloud computing environments.

In this example, file system engines may be arranged to employ cloud computing environment services 708 to generate storage images from storage volume. In some embodiments, storage image 710 may represent a storage image generated from storage volume 702. Accordingly, in some embodiments, storage image 710 may be comprised of data image 712 and storage image metadata 714. In some embodiments, data image 712 may represent a cloud computing environment specific data snapshot of the information that may be stored in data storage 704. Similarly, in some embodiments, metadata 714 may represent various metadata associated with storage image 710.

As mentioned above, in some cases, cloud computing environments may not provide a sufficient metadata service/system. If so, in some embodiments, file system engines may be arranged to provide a customized/internal metadata system that may be employed to associate metadata with storage volumes or storage images.

Figure 8:
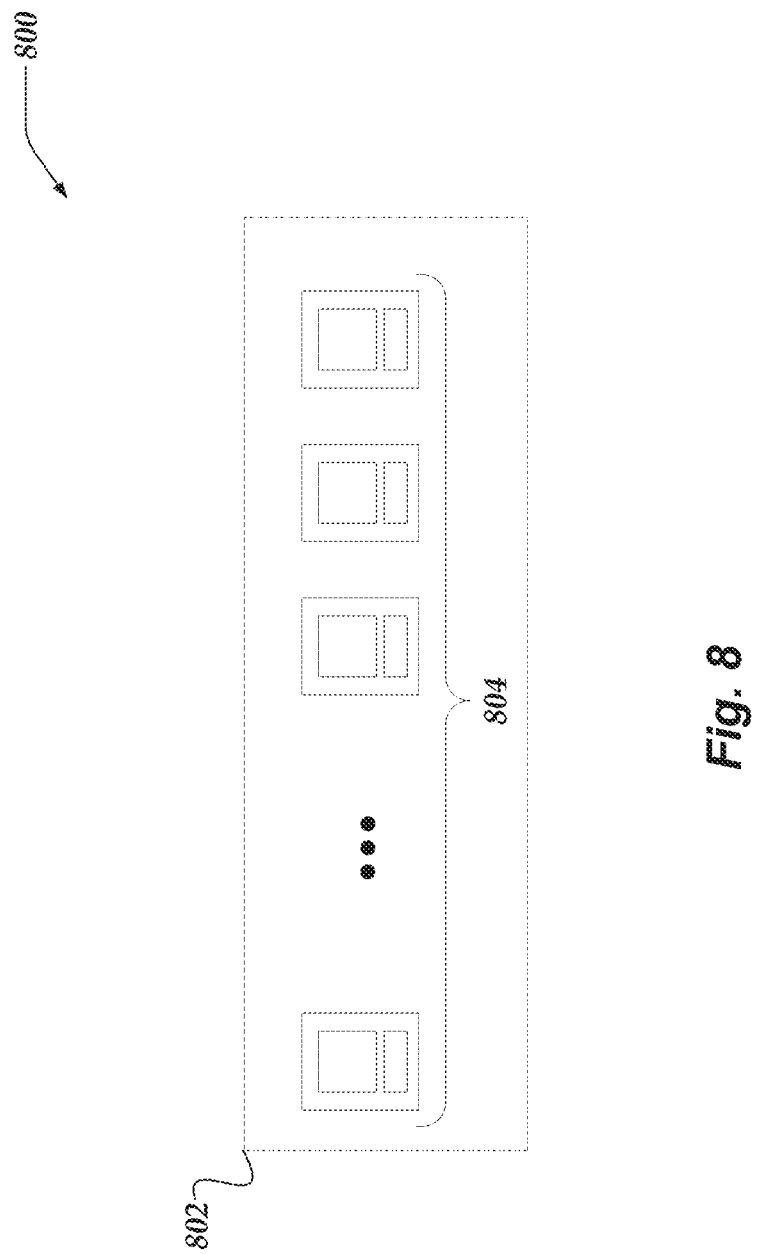
FIG. 8 illustrates a logical schematic of a system for backup services for distributed file systems in cloud computing environments in accordance with one or more of the various embodiments.

FIG. 8 illustrates a logical schematic of system 800 for backup services for distributed file systems in cloud computing environments in accordance with one or more of the various embodiments. In one or more of the various embodiments, file system engines may be arranged to logically group one or more storage images into backup collections, such as, backup collection 802 that includes storage images 804.

In one or more of the various embodiments, backup collections may be data structures that associate one or more storage images that may correspond to one or more storage volumes for one or more different storage nodes in a file system.

In some embodiments, file system may include more than one storage nodes each with one or more storage volumes. In some cases, cloud computing environment may generate storage images from storage volumes that may each be identified individually rather being associate with a cluster of two or more storage nodes. Accordingly, in one or more of the various embodiments, file system engines may be arranged to generate backup collections to associate the storage images generated from the same file system cluster.

Accordingly, in some embodiments, file system engines may be arranged to generate a unique identifier for each backup job and associate that unique identifier with each storage image associated with file system cluster. In some cases, for brevity or clarity, these identifiers may be referred to as backup identifiers. Accordingly, in this example, storage images 804 may be assumed to be associated with a same valued backup identifier. In this example, dashed line used to illustrate backup collection 802 represent a logical boundary or grouping defined by each included storage image being associated with the same valued backup identifier.

In one or more of the various embodiments, file system engines may be arranged to include the backup identifier in the metadata generated for storage images. Thus, in some embodiments, file system engines may be arranged to employ the backup identifier in query expressions, or the like, to identify the storage images in a cloud computing environment that may be associated with a particular backup collection.

Generalized Operations

FIGS. 9-13 represent generalized operations for backup services for distributed file systems in cloud computing environments in accordance with one or more of the various embodiments. In one or more of the various embodiments, processes 900, 1000, 1100, 1200, and 1300 described in conjunction with FIGS. 9-13 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-13 may perform actions for backup services for distributed file systems in cloud computing environments in accordance with at least one of the various embodiments or architectures such as those described in conjunction with FIGS. 4-8. Further, in one or more of the various embodiments, some or all of the actions performed by processes 900, 1000, 1100, 1200, and 1300 may be executed in part by file system engine 322.

Figure 9:
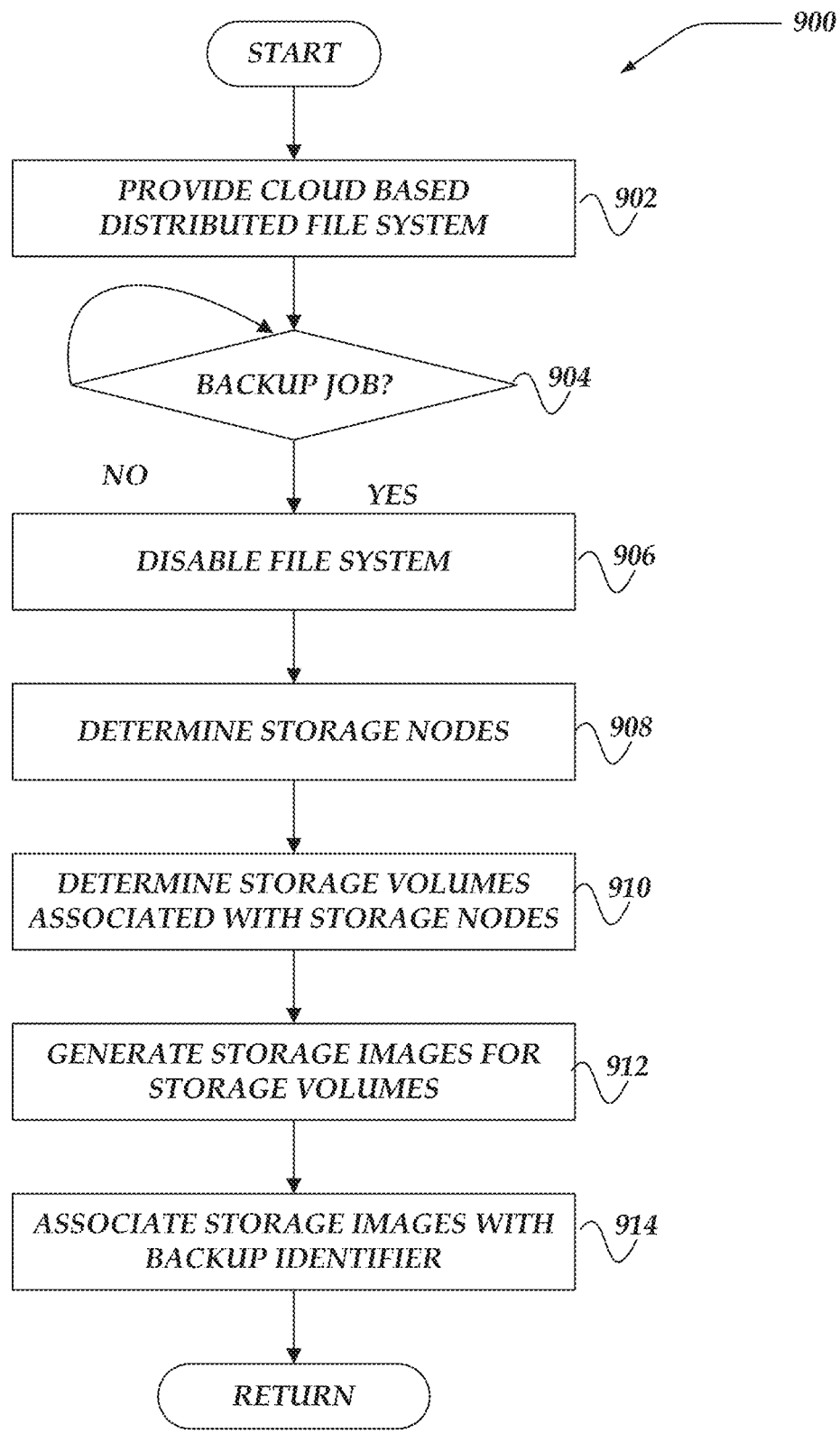
FIG. 9 illustrates an overview flowchart for a process for backup services for distributed file systems in cloud computing environments in accordance with one or more of the various embodiments.

FIG. 9 illustrates an overview flowchart for process 900 for backup services for distributed file systems in cloud computing environments in accordance with one or more of the various embodiments. After a start block, at block 902, in one or more of the various embodiments, a cloud based distributed file system may be provided.

In one or more of the various embodiments, organizations may employ one or more install scripts, setup programs, configuration tools, or the like, to provide distributed file system in cloud computing environments. In some embodiments, the particular arrangement of storage nodes, clusters, storage slots, storage volumes, or the like, may vary depending on the needs of the organization or the capabilities of the cloud computing environment.

At decision block 904, in one or more of the various embodiments, if a backup job is initiated, control may flow to block 906; otherwise, control may loop back to decision block 904. In one or more of the various embodiments, backup jobs may be scheduled to automatically happen at particular times or under certain conditions. Accordingly, in some embodiments, file system engines may be arranged to employ rules, schedules, conditions, or the like, provided via configuration information to account for local requirements or local circumstances.

Further, in some embodiments, file system engines may be arranged to enable users to initiate backup jobs via one or more user interfaces.

At block 906, in one or more of the various embodiments, file system engines may be arranged to disable access to the file system. In one or more of the various embodiments, file system engines may be arranged to disable user access to the file system. In some embodiments, file system engines may be arranged to promulgate one or more commands to the one or more storage nodes comprising the file system. In some embodiments, file system engines may be arranged to shutdown the file system by terminating the file system engines that may be running on different compute instances in the cloud computing environment. Alternatively, in some embodiments, file system engines may be arranged to communicate a message or employ an API to disable or shutdown the file system engines running on different nodes in the file system. Note, in some embodiments, one or more file system engines may remain operative to execute the actions associated with providing the backup services. In some embodiments, the one or more file system engines performing the backup jobs may be on one or more other compute instances rather than running on storage nodes. Likewise, in some embodiments, sub-processes of a file system engine, such as, backup agents or backup job runner services that enable backup jobs but not normal file system operations may be running on the one or more storage nodes to perform the backup job actions.

At block 908, in one or more of the various embodiments, file system engines may be arranged to determine one or more storage nodes that may be associated with a file system cluster in a cloud computing environment. In one or more of the various embodiments, file system configuration information may include identifiers or network address information of the various storage nodes of the file system cluster. Alternatively, file system configuration information may include one or more tags or keys that may be associated with the file system that may be used to identify each storage node in the cloud computing environment. For example, in some embodiments, a key value corresponding the file system cluster may be associated with each storage node as part of the deployment of the file system in the cloud computing environment. Accordingly, in this example, the storage nodes may be determined by querying the cloud computing environment using the key value. In some embodiments, file system engines may be arranged to support different cloud computing environments that employ different mechanisms for identifying nodes or associating nodes with file system. Thus, in some embodiments, file system engines may be arranged to employ rules, instructions, or the like, provided via configuration information to determine the specific actions for identifying the storage nodes in the cloud computing environment.

At block 910, in one or more of the various embodiments, file system engines may be arranged to determine one or more storage volumes that may be associated with the one or more storage nodes. In one or more of the various embodiments, metadata associated with storage nodes may be employed to identify the one or more storage volumes that may be associated with each storage node.

At block 912, in one or more of the various embodiments, file system engines may be arranged to generate one or more storage images for the one or more storage volumes. In one or more of the various embodiments, as described above, file system engines employ cloud computing environment APIs, or thee like, to generate storage images that correspond to the one or more storage volumes.

At block 914, in one or more of the various embodiments, file system engines may be arranged to associate the one or more storage images with a backup identifier that corresponds to the backup job. In one or more of the various embodiments, the metadata for each storage image associated with a backup job may be updated to include an identifier that corresponds the backup job. For example, in some embodiments, if backing up the file system produces 16 storage images, each storage image may be associated with the same valued backup job identifier. Accordingly, in some embodiments, file system engines may be arranged to determine the storage images associated with a particular backup job based on the backup job identify that may be included in the metadata for each storage image.

Next, in one or more of the various embodiments, control may be returned to a calling process.

Figure 10:
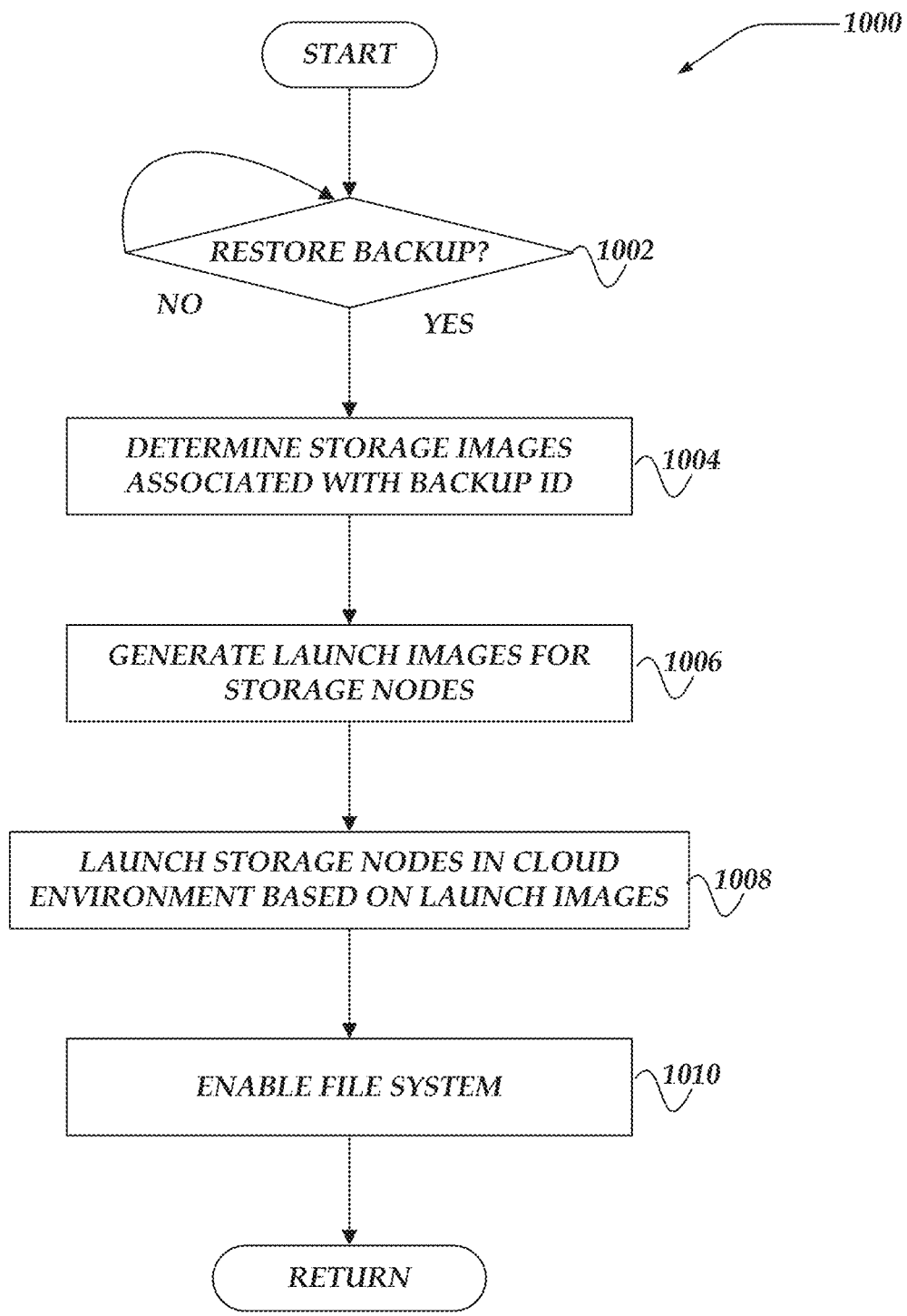
FIG. 10 illustrates a flowchart for a process for backup services for distributed file systems in cloud computing environments in accordance with one or more of the various embodiments.

FIG. 10 illustrates a flowchart for process 1000 for backup services for distributed file systems in cloud computing environments in accordance with one or more of the various embodiments. After a start block, at decision block 1002, in one or more of the various embodiments, if restoration of a backup may be requested, control may flow block 1004; otherwise, control may loop back to decision block 1002.

In one or more of the various embodiments, a backup identifier may be provided to file system engines to initiate the process to restore a file system backup. As described above, each backup job may be associated with a unique backup identifier that may be associated with each storage image associated with a particular backup job.

At block 1004, in one or more of the various embodiments, file system engines may be arranged to determine one or more storage images that may be associated with the backup restoration based on a backup identifier.

In one or more of the various embodiments, file system engines may be arranged to employ one or more query services provided by cloud computing environments to identify the storage images that may be associated with a previously completed backup job. In some embodiments, if the cloud computing environment does not provide sufficient query services, the file system engines may be arranged to provide its own catalog or index to keep a record of the storage images that may be associated with backup jobs.

In one or more of the various embodiments, file system engines may be arranged to provide a user interface that enables users or services to provide a query that includes one or more filters, or the like, that may be employed to generate one or more reports that list the storage images in the cloud computing environment that may be associated with a user, user account, backup identifier, file system, cluster name, or the like.

Similarly, in some embodiments, file system engines may be arranged to provide a user interface that enables authorized users to delete one or more storage images that may be determined via one or more queries to the cloud computing environment.

At block 1006, in one or more of the various embodiments, file system engines may be arranged to generate one or more launch images for the storage nodes. In one or more of the various embodiments, launch images may be data structures that cloud computing environments use to determine the attributes associated with compute instances. Accordingly, in one or more of the various embodiments, file system engines may be arranged to generate launch images for storage nodes that the cloud computing environments may employ to instantiate or provision compute instances.

In some embodiments, cloud computing environments may employ the launch images to instantiate or provision compute instances.

In one or more of the various embodiments, launch images may include information associated with selecting the storage images that should be used to provide storage volumes for each storage node.

Also, in some embodiments, launch images may include startup information for the storage nodes. In one or more of the various embodiments, the startup information may include information that the cloud computing environment employs to configure and launch the storage node, including starting the operating system and file system services. In some embodiments, the cloud computing environment may copy startup information from the launch image to storage node such that the startup information is applied if the storage node boots up.

At block 1008, in one or more of the various embodiments, file system engines may be arranged to launch one or more storage nodes in the cloud computing environment based on the one or more launch images.

In one or more of the various embodiments, file system engines may be arranged to employ one or more APIs or interface provided by the cloud computing environment to provision storage nodes that are based on corresponding launch images.

At block 1010, in one or more of the various embodiments, file system engines may be arranged to enable the file system.

In one or more of the various embodiments, as storage nodes boot up and the file system services (e.g., local file system engines) are started, the distributed file system may prepare itself for operation. In some embodiments, this may include identifying other storage nodes in the cluster, electing a controller node, synchronizing/validating file system configuration state, or the like. In some embodiment, this process may be considered similar starting the file system on physical/on-premises hardware. For example, if a file system supports robust recovery or reboot operations, these same operations may be automatically performed as storage nodes are booted up into the cloud computing environment.

Next, in one or more of the various embodiments, control may be returned to a calling process.

Figure 11:
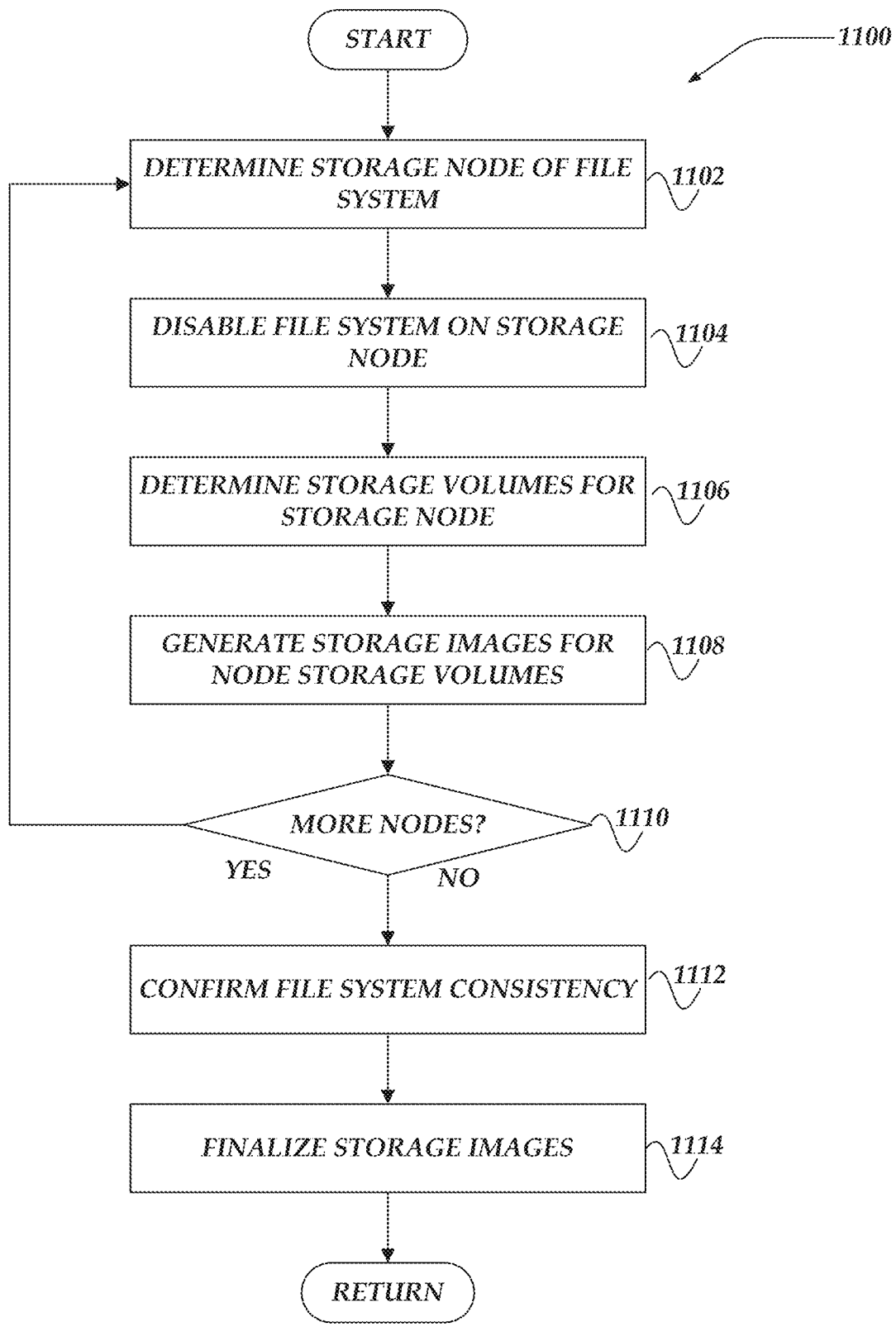
FIG. 11 illustrates a flowchart for a process for backup services for distributed file systems in cloud computing environments in accordance with one or more of the various embodiments.

FIG. 11 illustrates a flowchart for process 1100 for backup services for distributed file systems in cloud computing environments in accordance with one or more of the various embodiments. After a start block, at block 1102, in one or more of the various embodiments, file system engines may be arranged to determine one or more storage nodes of the file system.

In one or more of the various embodiments, file system engines may be arranged to query a controller node of a file system to determine the network addresses of the storage nodes in a file system cluster in a cloud computing environment. In some embodiments, if the controller node may be initiating the backup job, the identities of the storage nodes in the file system cluster may be readily available. Also, in some embodiments, file system engines may be arranged to enable users or administrators to provide the information required for determine each storage node to include in the backup job.

At block 1104, in one or more of the various embodiments, file system engines may be arranged to disable the file system on each storage node. In one or more of the various embodiments, file system engines may be arranged to perform one or more actions to disable or shutdown a file system to prevent users from altering the state of the file system while it is being backed up.

In some embodiments, file system engines may be arranged to generate a message or call an API or interface of the file system to disable the file system engine running on a particular node. In some embodiments, the file system engine (or other relevant processes) that may be running on the storage node may be terminated to prevent the file system from responding to file system requests, such as, reads or writes from file system clients.

In one or more of the various embodiments, file system engines may be arranged to record a timestamp associated with the shutdown of the file system processes on the storage node. Accordingly, in some embodiments, the shutdown timestamp may be generated after the storage node is disabled from participating in the file system. Accordingly, in some embodiments, the shutdown/termination timestamp for each storage node may be recorded.

At block 1106, in one or more of the various embodiments, file system engines may be arranged to determine one or more storage volumes for each storage node.

As described above, in one or more of the various embodiments, storage nodes may be associated with one or more storage volumes. In some embodiments, file system engines may have access to a list of cloud computing environment storage volume identifiers that may correspond to the storage volumes associated with each storage node. Also, in some embodiments, file system engines may be arranged to employ cloud computing environment query services to identify the storage volumes for a storage node based on the cloud computing environment identifier associated with the storage volume. Note, in some embodiments, different cloud computing environments may provide different types of query services, or the like, for determining the storage volume that may be associated with the storage node. Accordingly, in some embodiments, file system engines may be arranged to generate the necessary query expressions or perform the necessary query actions based on configuration information to account for local requirements or local circumstances.

At block 1108, in one or more of the various embodiments, file system engines may be arranged to generate one or more storage images for the storage volumes associated with storage nodes.

In one or more of the various embodiments, file system engines may be arranged to employ one or more cloud computing environment APIs or interfaces to generate storage images that correspond to the storage volumes.

At decision block 1110, in one or more of the various embodiments, if more storage nodes remain to be backed up, control may loop back to block 1102; otherwise, control may flow to block 1112. In one or more of the various embodiments, file system engines may continue generating storage images until each storage volume for each storage node in a file system cluster has been considered. Note, in some cloud computing environments, the storage volume to storage image process may be running asynchronously. Thus, in some embodiments, the steps described above may be executed for multiple storage volumes without waiting for any particular storage image to be generated.

At block 1112, in one or more of the various embodiments, file system engines may be arranged to confirm that the file system remained in a consistent state.

In one or more of the various embodiments, if all the requested storage images have been generated, file system engines may be arranged to confirm that the file system remained in a consistent state from start to finish. Accordingly, in some embodiments, file system engines may be arranged to compare a record of the shutdown timestamp for each storage node with a current shutdown timestamp stored on the storage node. For example, in some embodiments, if the shutdown timestamp for storage node A is 1101111, the file system engines may confirm that the current shutdown timestamp for storage node A is 1101111. Accordingly, in this example, if there is a mismatch, the file system engines may determine that the file system services for storage node A were restarted since the first shutdown directive was issued.

In one or more of the various embodiments, comparing recorded shutdown timestamp with the current shutdown timestamp enables file system engines to confirm that no file system activity occurred on storage node. Accordingly, in one or more of the various embodiments, the file system engines can confirm that the information in the storage image is as expected without having to expend time or resources to compare files in the file system to identify changes or discrepancies.

Note, in some embodiments, if a shutdown token mismatch is discovered, the file system engines may be arranged to abort the backup job.

At block 1114, in one or more of the various embodiments, file system engines may be arranged to finalize the one or more storage images. In some embodiments, if file system engines may confirm that each storage node in the file system cluster remained consistent based on the shutdown timestamps, file system engines may be arranged to generate a token that indicates the backup has been finalized. In some embodiments, the finalize token may be associated with storage image that was generated for the backup job and stored in the metadata associated with the storage images.

Accordingly, in some embodiments, file system engines may determine if a backup is valid if all of the storage images associated with its backup identifier are also associated with a finalized token.

Also, in one or more of the various embodiments, file system engines may be arranged to provide a user interface that enables users or services to validate or verify a file system on-demand. Accordingly, in some embodiments, file system engines may be arranged to enable users or services to trigger a validation/verification process to evaluate the current state of a file system.

Next, in one or more of the various embodiments, control may be returned to a calling process.

Figure 12:
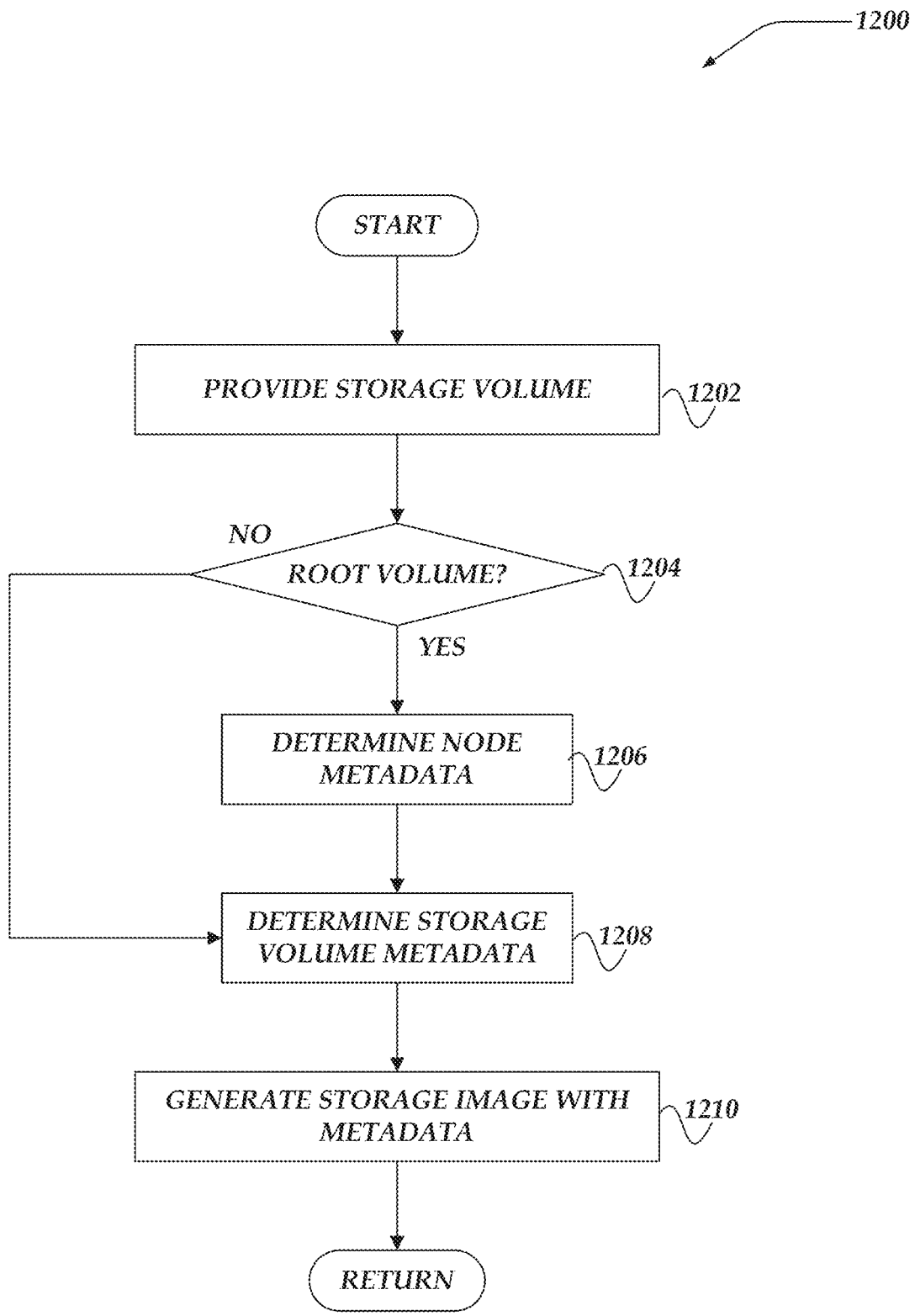
FIG. 12 illustrates a flowchart for a process for backup services for distributed file systems in cloud computing environments in accordance with one or more of the various embodiments.

FIG. 12 illustrates a flowchart for process 1200 for backup services for distributed file systems in cloud computing environments in accordance with one or more of the various embodiments. After a start block, at block 1202, in one or more of the various embodiments, file system engines may be provided a storage volume.

As described above, in one or more of the various embodiments, file system engines may be arranged to determine the storage volumes that may be associated with storage nodes of a distributed file system that may be backed up into a storage image.

At decision block 1204, in one or more of the various embodiments, if the storage volume is a root volume, control may flow to block 1206; otherwise, control may flow to block 1208.

In one or more of the various embodiments, one or more storage volumes associated with a storage node may be considered a root volume. In one or more of the various embodiments, root volumes may be storage volumes that are arranged to store the core programs, files, configuration files, startup scripts, or the like, that enable a storage node to operate. In some embodiments, the root volume may be the storage volume that the cloud computing environment considers to be the boot device for a given compute instance. Thus, in some embodiments, a storage node may include one root volume and zero or more data storage volumes.

In one or more of the various embodiments, file system engines may be arranged to distinguish root volumes from non-root data storage volumes because the storage image made from root volumes may include different metadata than non-root storage volumes.

At block 1206, in one or more of the various embodiments, file system engines may be arranged to determine node metadata.

In one or more of the various embodiments, node metadata may be considered the metadata that includes/stores one or more attributes associated with the storage node, such as, CPU size, volume arrangement, network configuration, operating system type/version, security/privilege information, or the like.

Also, in one or more of the various embodiments, node metadata may include file system startup information that enables file system engines to restore the storage node and the file system. In some embodiments, this information may include, slot/volume mapping, network addresses of the storage nodes in the cluster being backed up, node identifiers, backup identifiers, file system startup information, file system startup scripts, or the like.

In one or more of the various embodiments, distributed file systems in cloud computing environments may require one or more startup scripts that enable the file system to be reestablished from its storage images. Accordingly, in some embodiments, these startup scripts may be included in the node metadata.

At block 1208, in one or more of the various embodiments, file system engines may be arranged to determine storage volume metadata.

In one or more of the various embodiments, storage volume metadata may include information derived from the file system and storage volume that enable the storage volume to be restored from a storage image.

In one or more of the various embodiments, storage volume metadata may include, slot information, volume type (e.g., root volume or data volume), volume size, block device name, backup time, backup (job) identifier, finalization token, or the like. Note, the finalization token may be assigned to storage image during the finalization of the backup job after all the storage images have been generated and validated.

At block 1210, in one or more of the various embodiments, file system engines may be arranged to generate one or more storage images.

In one or more of the various embodiments, file system engines may be arranged to employ one or more cloud computing environment APIs or interfaces to automatically provide the metadata with a storage volume identifier to the cloud computing environment. Accordingly, in some embodiments, the cloud computing environment may generate a storage image from the storage volume and associate the metadata with the storage image.

Next, in one or more of the various embodiments, control may be returned to a calling process.

Figure 13:
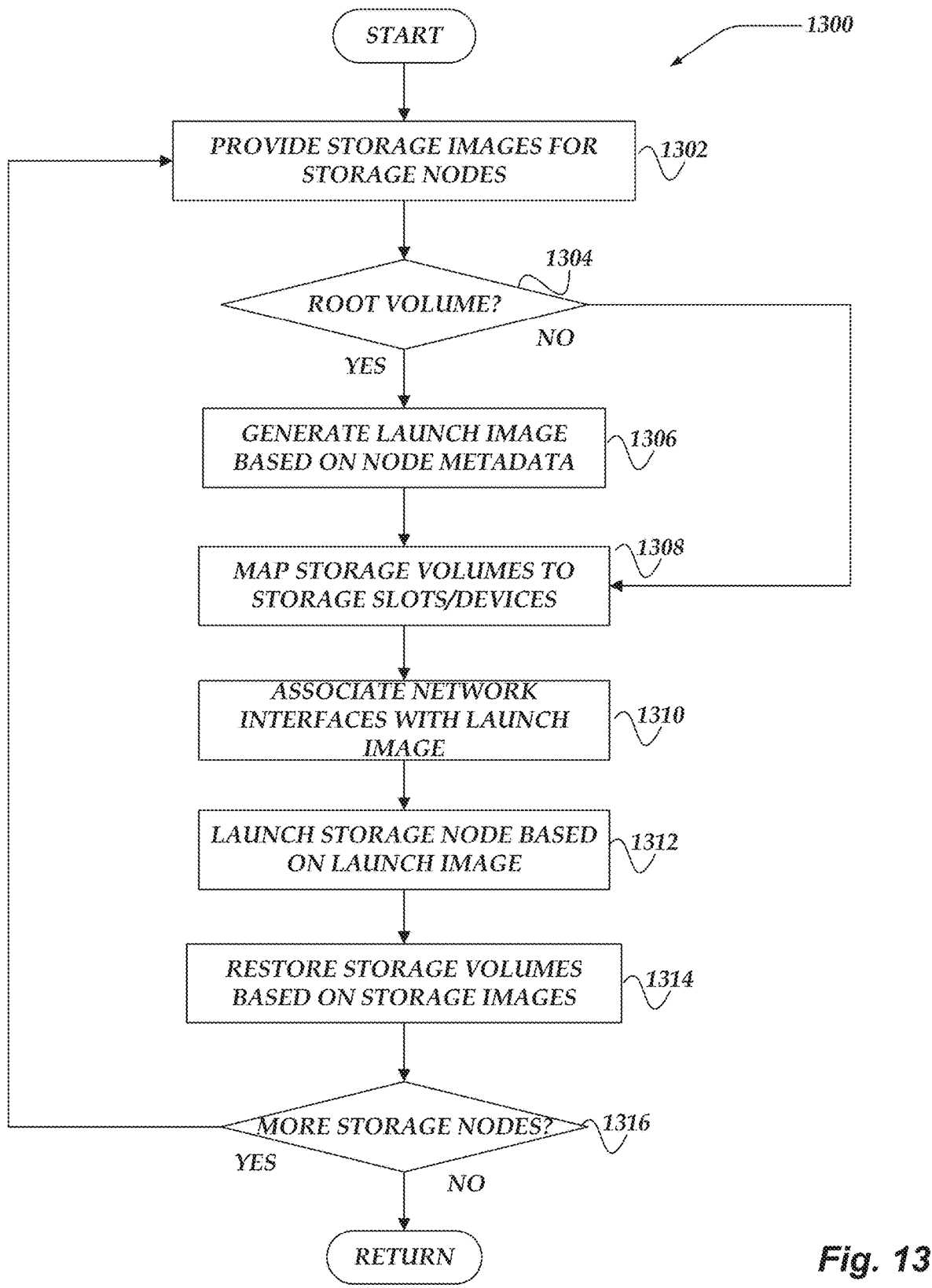
FIG. 13 illustrates a flowchart for a process for backup services for distributed file systems in cloud computing environments in accordance with one or more of the various embodiments.

FIG. 13 illustrates a flowchart for process 1300 for backup services for distributed file systems in cloud computing environments in accordance with one or more of the various embodiments. After a start block, at block 1302, in one or more of the various embodiments, file system engines may be arranged to provide the one or more storage images for one or more storage nodes in a file system cluster. As described above, in some embodiments, file system engines may be arranged to associate metadata with storage images when performing backups. In some embodiments, the metadata may enable storage images to be determined or referenced using APIs or interfaces provided by cloud computing environments. In some cases, in the absence of sufficient APIs or interfaces, file system engines may be arranged to provide custom catalogs or indices that associate storage image identifiers with metadata that may be stored or otherwise managed by file system management server computers.

In one or more of the various embodiments, file system engines may be arranged to determine the storage images based on backup identifiers associated with each backup that is being restored. As described above, in some embodiments, each storage image may be associated with a backup identifier that corresponds to the file system and a particular backup job. Also, in some embodiments, storage images may be associated with metadata, such as, node identifiers, that enable file system engines to determine the storage images that should be associated with a storage node (e.g., compute instance) in the cloud computing environment.

Accordingly, in some embodiments, file system engines may be arranged to employ the metadata included with the storage images to reconstruct the source file system. In some embodiments, this may include grouping one or more storage images into collections that may correspond to storage nodes. For example, in some embodiments, if storage node A was configured to use eight storage volumes, there may be eight storage images that are associated with a metadata identifier that corresponds to storage node A. Thus, in some embodiments, file system engines may be enabled to determine the storage images that should be attached to the same storage nodes based on the metadata associated with storage images.

At decision block 1304, in one or more of the various embodiments, if the storage image corresponds to storage volume that may be a root volume, control may flow to block 1306; otherwise, control may flow to block 1308.

As described above, in some embodiments, storage nodes may be associated with more than one storage volume. In some cloud computing environments, one or more storage volumes may have unique properties with respect to other storage volumes attached to the same storage node. In some embodiments, root volumes may be storage volumes that store important software, such as, operating systems, file system engines, or the like. Accordingly, in some embodiments, root volumes may require special or different handling than non-root storage volumes.

At block 1306, in one or more of the various embodiments, file system engines may be arranged to generate a launch image based on the node metadata included in the root volume.

In one or more of the various embodiments, file system engines may be arranged to generate a launch image that conforms to the requirements of the cloud computing environment. In general, in some embodiments, cloud computing environments provide various parameters enable file system engines to declare one or more characteristics that may be applied when instantiated compute instances. In some embodiments, the launch image may be employed to provide a template-like definition that the cloud computing environment employs to provision and launch the one or more compute instances that will be the storage nodes for the file system.

In one or more of the various embodiments, the particular fields, parameters, APIs, or the like, may vary depending on the cloud provider or cloud computing environment. Accordingly, in some embodiments, file system engines may be arranged to employ configuration information to determine or provide the libraries, APIs, parameters/arguments, data structures, or the like, for generating launch images that conform to a particular cloud computing environment.

In some embodiments, some cloud computing environments may provide dedicated launch image systems that enable file system engines to progressively provide attributes that correspond to the source/original storage node that was backed up. In some embodiments, this may include selecting or activating one or more proprietary features of a given cloud computing environment. For example, in some embodiments, a launch image may be employed to declare various attributes, such as, CPU size, geographic region, network configuration (e.g., IP address, routing rules, or the like), service quotas, permission/access rules, or the like. Often different cloud computing environments may offer similar features using different proprietary labels, formats, parameter collections, or the like. However, one of ordinary skill in the art will be familiar with the specific actions or information that may be required to generate a launch image in a particular cloud computing environment. Accordingly, in some embodiments, file system engines may be arranged to employ configuration information selectively determine how generate launch images based on the cloud computing environment.

Also, in one or more of the various embodiments, file system engines may be arranged to include instructions, parameters, attribute values, or the like, associated with the configuration of the distributed file system. In some embodiments, this information may include file system cluster configuration information that file system engines running on compute instance may employ to activate or deploy the file system. In some embodiments, the file system startup information may include launch scripts, configuration files, or the like, that may be associated with the operation of the file system.

At block 1308, in one or more of the various embodiments, file system engines may be arranged to map one or more storage volumes to one or more storage slots or storage devices.

In one or more of the various embodiments, file system engines may be arranged to generate a data structure that declares how storage volumes may be arranged on particular storage nodes. In one or more of the various embodiments, this information may enable cloud computing environments to couple storage volumes generated from storage images to block devices (e.g., virtualized hard drives or SSDs) that may be employed by storage nodes.

In some embodiments, the data structures for mapping storage images, storage volumes, block devices, or the like, with each other may vary depending the operating system intended for storage nodes or the particular cloud computing environment. One of ordinary skill in the art will be familiar with the requirements of the cloud computing environment. Accordingly, in some embodiments, file system engines may be arranged to employ configuration information that includes instructions, parameters, scripts, plug-ins, modules, or the like, targeted to specific cloud computing environments. For example, in some embodiments, if the storage nodes may be running a Linux-like operating system, storage volumes may be mapped to named block devices.

In one or more of the various embodiments, the block device name and mount point information may be recovered from the metadata associated with each storage image. For example, if a Linux-like operating is employed, a record such as "sda1=>volume 3455656" may be generated for each storage image or storage volume associated with a storage node. Note, in some embodiments, file system engines may be arranged to collect this mapping information as metadata during the backup job that generated the storage images.

Note, in some embodiments, the information for mapping the block devices, storage volumes, or storage images may be considered part of a launch image. Thus, in some embodiments, the mapping information may be added to a launch image. In some embodiments, the mapping information may be referenced by a launch image or provided to the cloud computing environment via another interface. Accordingly, in some embodiments, file system engines may be arranged to determine how to format or provide the mapping information to various cloud computing environments based on configuration information to account for local requirements or local circumstances. One of ordinary skill in the art will appreciate how to provide scripts, configuration information, or the like, that may enable mapping storage images to storage volumes or block devices for a particular cloud computing environment.

At block 1310, in one or more of the various embodiments, file system engines may be arranged to associate one or more network interfaces with the launch image. In some embodiments, cloud computing environments may provide one or more virtualized network interfaces that may be associated with storage nodes. In some embodiments, network interfaces in cloud computing environments may be allocated (instantiated) to a user or organizations. Thus, in some embodiments, there may be one or more network interfaces that are already instantiated but not associated with a storage node.

In one or more of the various embodiments, file system engines may be arranged to query the cloud computing environment to determine if one or more unused network interfaces may be available. In some embodiments, the available network interfaces may be associated network address information, or the like, that may be included in queries to identify network interfaces.

In some embodiments, the number of available/instantiated network interfaces that are not otherwise associated with computers or nodes may be insufficient. Accordingly, in some embodiments, file system engines may be arranged to employ the cloud computing environment to generate or instantiate new network interfaces for the nodes being launched. In some embodiments, the network interface configuration information, including network address information may be obtained from metadata that is stored with the root volume.

In one or more of the various embodiments, network interfaces may be associated with live storage nodes as they are launched.

At block 1312 in one or more of the various embodiments, file system engines may be arranged to launch a storage node in the cloud computing environment based on the launch image.

In one or more of the various embodiments, cloud computing environments may provide one or more APIs or interfaces that enable programmatic provisioning of compute instances. Accordingly, in some embodiments, file system engines may be arranged to employ the cloud computing environment APIs or interfaces, the launch images, mapping information, or the like, to provision one or more compute instances that may be storage nodes in a distributed file system in cloud computing environment.

In one or more of the various embodiments, cloud computing environments may install the file system startup information on new compute instances as they are provisioned. Accordingly, in some embodiments, instructions included in the startup information may be executed if the computer instance is booted up in the cloud computing environment. In some embodiments, the file system startup information may include information, such as, network information that enables storage nodes to find or identify other storage nodes in their cluster. For example, in some embodiments, the launch image may be configured to include a list of network addresses that correspond to each storage node in file system cluster. Accordingly, in this example, if a compute instance corresponding to a storage node is booted up (launched) in a cloud computing environment, a file system engine may be automatically launched on the storage node and the file system engine may be arranged to employ the file system startup information to locate other storage nodes.

For example, in some embodiments, if the file system startup information includes the IP addresses for the other nodes in the cluster, as each file system engine is launched on each newly provisioned storage node, the file system engines may conventionally attempt to communicate with other storage nodes in its cluster using the IP addresses included in the file system startup information. Note, in some embodiments, robust distributed file systems may include similar functionality for physical on-premises (non-cloud) deployment. Thus, in some embodiments, file system engines on newly provisioned storage nodes may perform actions similar as if they were running on newly installed or rebooted physical network computers. In some embodiments, the particular actions may vary depending on the file system, but one of ordinary skill in the art will appreciate that the actions may include actions that may be considered otherwise "normal" initialization of distributed file systems. Accordingly, in some embodiments, such actions may include, identifying other storage nodes in the cluster, electing a controller node, seeking a quorum, validating the consistency of the file system, confirming capacity, or the like.

At block 1314, in one or more of the various embodiments, file system engines may be arranged to restore the one or more storage volumes based on the one or more storage images and the metadata.

In one or more of the various embodiments, cloud computing environments may automatically generate storage volumes from storage images and map them to a compute instance based on the launch image and the mapping information. In some embodiments, cloud computing environments may execute storage node provisioning asynchronously such that several storage nodes or storage images may be provisioned at the same time.

Note, in some embodiments, the actions described for this block may be performed as part of the launch image actions described for block 1312

At decision block 1316, in one or more of the various embodiments, if there may be more storage nodes to restore, control may loop back to block 1302; otherwise, control may be returned to a calling process.

In one or more of the various embodiments, file system engines may continue launching storage nodes and restoring storage images until each storage node of the file system may be provisioned and configured for operation.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that are configured to execute instructions to perform actions, comprising:
   providing the file system that includes a plurality of storage nodes and a plurality of storage volumes, wherein each of the plurality of storage nodes are based on a compute instance provided by a cloud computing environment (CCE); and
   in response to execution of a backup job, performing further actions, including:
      disabling the file system and each of the plurality of storage nodes;

identifying one or more storage volumes that are associated with the plurality of disabled storage nodes; and generating a launch image based on node metadata for a root storage volume; and in response to generating one or more storage images that archive a copy of information from the one or more identified storage volumes, performing further actions, including:

employing the launch image to re-enable both the file system and the plurality of storage nodes; and associating one or more network interfaces with the launch image and one or more of the plurality of storage nodes.

2. The method of claim 1, further comprising:
employing the CCE to provide one or more data stores for the one or storage volumes.

3. The method of claim 1, further comprising, in response to a confirmation that the file system is consistent, associating a finalized tag with each storage image.

4. The method of claim 1, wherein disabling the file system and the plurality of storage nodes further comprises:
associating each disabled storage node with a shutdown timestamp; and
confirming that the file system is consistent based on an absence of file system activity occurring subsequent to each shutdown timestamp.

5. The method of claim 1, wherein generating the one or more storage images, further comprises:
determining a root volume included with the one or more storage volumes;
generating storage node metadata that includes information associated with the storage node that is associated with the root volume; and
associating the storage node metadata with a storage image that corresponds to the root volume.

6. The method of claim 1, wherein generating the one or more storage images, further comprises:
generating storage volume metadata that includes information associated with each storage volume; and
associating the storage volume metadata for each storage volume with each storage image.

7. The method of claim 1, further comprising:
providing a backup identifier that corresponds to the backup job;
determining the plurality of storage images based on the backup identifier;
determining storage node metadata from each storage image that corresponds to a root volume;
generating one or more launch images based on the storage node metadata; and
employing the one or more launch images to instantiate the plurality of storage nodes.

8. A network computer for managing data in a file system, comprising:
memory that stores at least instructions; and
one or more processors that execute instructions that perform actions, including:
providing the file system that includes a plurality of storage nodes and a plurality of storage volumes, wherein each of the plurality of storage nodes are based on a compute instance provided by a cloud computing environment (CCE); and
in response to execution of a backup job, performing further actions, including:
disabling the file system and each of the plurality of storage nodes;

identifying one or more storage volumes that are associated with the plurality of disabled storage nodes; and generating a launch image based on node metadata for a root storage volume; and in response to generating one or more storage images that archive a copy of information from the one or more identified storage volumes, performing further actions, including:

employing the launch image to re-enable both the file system and the plurality of storage nodes; and associating one or more network interfaces with the launch image and one or more of the plurality of storage nodes.

9. The network computer of claim 8, further comprising:
employing the CCE to provide one or more data stores for the one or storage volumes.

10. The network computer of claim 8, further comprising, in response to a confirmation that the file system is consistent, associating a finalized tag with each storage image.

11. The network computer of claim 8, wherein disabling the file system and the plurality of storage nodes further comprises:
associating each disabled storage node with a shutdown timestamp; and
confirming that the file system is consistent based on an absence of file system activity occurring subsequent to each shutdown timestamp.

12. The network computer of claim 8, wherein generating the one or more storage images, further comprises:
determining a root volume included with the one or more storage volumes;
generating storage node metadata that includes information associated with the storage node that is associated with the root volume; and
associating the storage node metadata with a storage image that corresponds to the root volume.

13. The network computer of claim 8, wherein generating the one or more storage images, further comprises:
generating storage volume metadata that includes information associated with each storage volume; and
associating the storage volume metadata for each storage volume with each storage image.

14. The network computer of claim 8, further comprising:
providing a backup identifier that corresponds to the backup job;
determining the plurality of storage images based on the backup identifier;
determining storage node metadata from each storage image that corresponds to a root volume;
generating one or more launch images based on the storage node metadata; and
employing the one or more launch images to instantiate the plurality of storage nodes.

15. A processor readable non-transitory storage media that includes instructions for managing data in a file system over a network, wherein execution of the instructions by one or more processors on one or more network computers performs actions, comprising:
providing the file system that includes a plurality of storage nodes and a plurality of storage volumes, wherein each of the plurality of storage nodes are based on a compute instance provided by a cloud computing environment (CCE); and
in response to execution of a backup job, performing further actions, including:

disabling the file system and each of the plurality of storage nodes;

identifying one or more storage volumes that are associated with the plurality of disabled storage nodes; and generating a launch image based on node metadata for a root storage volume; and in response to generating one or more storage images that archive a copy of information from the one or more identified storage volumes, performing further actions, including:

employing the launch image to re-enable both the file system and the plurality of storage nodes; and associating one or more network interfaces with the launch image and one or more of the plurality of storage nodes.

16. The processor readable non-transitory storage media of claim 15, further comprising:

employing the CCE to provide one or more data stores for the one or storage volumes.

17. The processor readable non-transitory storage media of claim 15, further comprising:

providing a backup identifier that corresponds to the backup job;

determining the plurality of storage images based on the backup identifier;

determining storage node metadata from each storage image that corresponds to a root volume;

generating one or more launch images based on the storage node metadata; and employing the one or more launch images to instantiate the plurality of storage nodes.

18. The processor readable non-transitory storage media of claim 15, wherein disabling the file system and the plurality of storage nodes further comprises:

associating each disabled storage node with a shutdown timestamp; and confirming that the file system is consistent based on an absence of file system activity occurring subsequent to each shutdown timestamp.

19. The processor readable non-transitory storage media of claim 15, wherein generating the one or more storage images, further comprises:

determining a root volume included with the one or more storage volumes;

generating storage node metadata that includes information associated with the storage node that is associated with the root volume; and associating the storage node metadata with a storage image that corresponds to the root volume.

20. The processor readable non-transitory storage media of claim 15, wherein generating the one or more storage images, further comprises:

generating storage volume metadata that includes information associated with each storage volume; and associating the storage volume metadata for each storage volume with each storage image.

* * * * *